United States Patent
Determan et al.

(10) Patent No.: US 9,238,758 B2
(45) Date of Patent: *Jan. 19, 2016

(54) STRETCH RELEASABLE ADHESIVE TAPE

(71) Applicant: 3M INNOVATIVE PROPERTIES COMPANY, St. Paul, MN (US)

(72) Inventors: Michael D. Determan, Mahtomedi, MN (US); Albert I. Everaerts, Oakdale, MN (US); Mark D. Purgett, Oakdale, MN (US); Thu-Van T. Tran, Maplewood, MN (US); James L. Bries, Cottage Grove, MN (US); Jeffrey O. Emslander, Stillwater, MN (US); Jayshree Seth, Woodbury, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/167,443

(22) Filed: Jan. 29, 2014

(65) Prior Publication Data

US 2014/0147667 A1    May 29, 2014

Related U.S. Application Data

(63) Continuation of application No. 12/919,806, filed as application No. PCT/US2009/036946 on Mar. 12, 2009, now Pat. No. 8,673,419.

(60) Provisional application No. 61/036,501, filed on Mar. 14, 2008.

(51) Int. Cl.
*B32B 9/00* (2006.01)
*B32B 33/00* (2006.01)
*C09J 7/02* (2006.01)

(52) U.S. Cl.
CPC ............. *C09J 7/0207* (2013.01); *C09J 7/0275* (2013.01); *C09J 2201/618* (2013.01);
(Continued)

(58) Field of Classification Search
CPC .. C09J 7/0207; C09J 7/0275; C09J 2201/618; C09J 2423/006; C09J 2483/00; G02F 2202/28
USPC ...................................... 428/40.1, 41.7, 41.8
See application file for complete search history.

(56) References Cited

U.S. PATENT DOCUMENTS

| | | | |
|---|---|---|---|
| 2,676,182 | A | 4/1954 | Daudt |
| 3,627,851 | A | 12/1971 | Brady |

(Continued)

FOREIGN PATENT DOCUMENTS

| | | |
|---|---|---|
| DE | 213 074 | 8/1984 |
| DE | 10003318 | 8/2001 |

(Continued)

OTHER PUBLICATIONS

ASTM Designation: D 1003-00, "Standard Test Method for Haze and Luminous Transmittance of Transparent Plastics", (Jul. 1, 2000) pp. 1-06 XP001179974.

(Continued)

*Primary Examiner* — Victor Chang
(74) *Attorney, Agent, or Firm* — Sandra K. Nowak

(57) ABSTRACT

An adhesive tape that is stretch releasable, articles that contain the adhesive tape, and uses of the adhesive tape are disclosed. The adhesive tapes include a backing layer that is adjacent to at least one pressure-sensitive adhesive layer. The backing layer typically is optically clear and includes a poly (alkylene) copolymer. The pressure-sensitive adhesive layer is a silicone-based adhesive composition. In many embodiments, the adhesive tape is optically clear.

21 Claims, 1 Drawing Sheet

(52) U.S. Cl.
CPC ....... *C09J 2423/006* (2013.01); *C09J 2483/00* (2013.01); *G02F 2202/28* (2013.01); *Y10T 428/14* (2015.01); *Y10T 428/1471* (2015.01); *Y10T 428/1476* (2015.01); *Y10T 428/24752* (2015.01); *Y10T 428/2848* (2015.01); *Y10T 428/2852* (2015.01); *Y10T 428/2896* (2015.01)

(56) References Cited

U.S. PATENT DOCUMENTS

| | | | |
|---|---|---|---|
| 3,772,247 | A | 11/1973 | Flannigan |
| 3,890,269 | A | 6/1975 | Martin |
| 4,472,480 | A | 9/1984 | Olson |
| 4,661,577 | A | 4/1987 | Jo Lane |
| 4,707,531 | A | 11/1987 | Shirahata |
| 4,736,048 | A | 4/1988 | Brown |
| 4,774,310 | A | 9/1988 | Butler |
| 4,935,484 | A | 6/1990 | Wolfgruber |
| 4,980,443 | A | 12/1990 | Kendziorski |
| 5,026,890 | A | 6/1991 | Webb |
| 5,082,706 | A | 1/1992 | Tangney |
| 5,110,890 | A | 5/1992 | Butler |
| 5,134,198 | A | 7/1992 | Stofko |
| 5,214,119 | A | 5/1993 | Leir |
| 5,219,928 | A | 6/1993 | Stofko |
| 5,248,739 | A | 9/1993 | Schmidt |
| 5,262,558 | A | 11/1993 | Kobayashi |
| 5,276,122 | A | 1/1994 | Aoki |
| 5,302,685 | A | 4/1994 | Tsumura |
| RE34,605 | E | 5/1994 | Schrenk |
| 5,319,040 | A | 6/1994 | Wengrovius |
| 5,360,659 | A | 11/1994 | Arends |
| 5,461,134 | A | 10/1995 | Leir |
| 5,512,650 | A | 4/1996 | Leir |
| 5,516,581 | A | 5/1996 | Kreckel |
| 5,578,381 | A | 11/1996 | Hamada |
| 5,579,162 | A | 11/1996 | Bjornard |
| 5,614,297 | A | 3/1997 | Velazquez |
| 5,677,376 | A | 10/1997 | Groves |
| 5,725,923 | A | 3/1998 | Lühmann |
| 5,882,774 | A | 3/1999 | Jonza |
| 6,001,471 | A | 12/1999 | Bries |
| 6,049,419 | A | 4/2000 | Wheatley |
| 6,231,962 | B1 | 5/2001 | Bries |
| 6,355,759 | B1 | 3/2002 | Sherman |
| 6,395,389 | B1 | 5/2002 | Lühmann |
| 6,403,113 | B1 | 6/2002 | Corzani |
| 6,407,195 | B2 | 6/2002 | Sherman |
| 6,441,118 | B2 | 8/2002 | Sherman |
| 6,527,900 | B1 | 3/2003 | Kreckel |
| 6,531,620 | B2 | 3/2003 | Brader |
| 6,569,521 | B1 | 5/2003 | Sheridan |
| 6,572,945 | B2 | 6/2003 | Bries |
| 6,664,359 | B1 | 12/2003 | Kangas |
| 6,723,407 | B2 | 4/2004 | Dollase |
| 6,832,445 | B2 | 12/2004 | Pitzen |
| 6,846,893 | B1 | 1/2005 | Sherman |
| 7,005,125 | B2 | 2/2006 | Ulmer |
| 7,078,093 | B2 | 7/2006 | Sheridan |
| 7,151,139 | B2 | 12/2006 | Tiller |
| 7,153,924 | B2 | 12/2006 | Kuepfer |
| 7,236,222 | B2 | 6/2007 | Yoda |
| 7,371,464 | B2 | 5/2008 | Sherman |
| 8,129,470 | B2 | 3/2012 | Dollase |
| 8,673,419 | B2 * | 3/2014 | Determan et al. ........... 428/40.1 |
| 2002/0054261 | A1 | 5/2002 | Sekiguchi |
| 2003/0031848 | A1 | 2/2003 | Sawada et al. |
| 2003/0232192 | A1 | 12/2003 | Kishioka |
| 2004/0109096 | A1 | 6/2004 | Anderson |
| 2004/0191509 | A1 | 9/2004 | Kishioka |
| 2007/0059520 | A1 | 3/2007 | Hatin |
| 2007/0077418 | A1 | 4/2007 | Sakurai |
| 2007/0148475 | A1 | 6/2007 | Sherman |
| 2008/0075960 | A1 | 3/2008 | Pocius |
| 2008/0280086 | A1 | 11/2008 | Sheridan |
| 2009/0130360 | A1 | 5/2009 | Damman et al. |
| 2011/0020640 | A1 | 1/2011 | Sherman |
| 2011/0126968 | A1 | 6/2011 | Determan |
| 2014/0024756 | A1 | 1/2014 | Krawinkel et al. |

FOREIGN PATENT DOCUMENTS

| | | |
|---|---|---|
| EP | 0 301 827 A2 | 2/1989 |
| EP | 1 225 554 A1 | 7/2002 |
| JP | 07-105781 | 4/1995 |
| JP | 09274439 | 10/1997 |
| JP | H11-152455 | 6/1999 |
| JP | 2002-167558 | 6/2002 |
| JP | 2004-041535 | 2/2004 |
| WO | WO 95/06691 | 3/1995 |
| WO | WO 97/40103 | 10/1997 |
| WO | WO 02/04571 | 1/2002 |
| WO | WO 2009/151686 | 12/2009 |

OTHER PUBLICATIONS

ASTM Designation: D 882-02, "Standard Test Method for Tensile Properties of Thin Plastic Sheeting" (Apr. 10, 2002) pp. 161-170.

Encyclopedia of Polymer Science and Engineering, vol. 15, John Wiley & Sons, New York, (1989), pp. 265 to 270.

Kenawy, "The Chemistry and Applications of Antimicrobial Polymers: A State-of-the-Art Review", *The American Chemical Society*, vol. 8, No. 5, pp. 1359-1384 (2007).

Polyethylene ROMPP Online [Online] Nov. 2003, pp. 1-6, XP002535261 Retrieved from the Internet: URL:http://www.roempp.com/prod/index1.html>[retrieved on Jul. 3, 2009].

Wei, "Easy Preparation of Crosslinked Polymer Films from Polyoxyalkylene Diamine and Poly(styrene-maleic anhydride) for Electrostatic Dissipation", *Journal of Applied Polymer Science*, vol. 103, pp. 716-723 (2007).

"Product Locator Results", Aug. 8, 2007, 4 pages, XP055080464, Retrieved from the Internet: URL: http://web.archive.org/web/20070808180057/http://www.dupontteijinfilms.com/FilmEnterprise/ProductLocatorResults.asp?ProductID=3&Version=US [retrieved on Sep. 16, 2013].

* cited by examiner

STRETCH RELEASABLE ADHESIVE TAPE

CROSS REFERENCE TO RELATED APPLICATIONS

This application is a continuation application of U.S. application Ser. No. 12/919,806, filed Aug. 27, 2010, now allowed, which is a national stage filing under 35 U.S.C. 371 of PCT/US2009/036946, filed Mar. 9, 2009, which claims the benefits of U.S. Provisional Patent Application No. 61/036,501 filed on Mar. 14, 2008, the disclosures of which are incorporated by reference in their entireties herein.

TECHNICAL FIELD

An adhesive tape that is stretch releasable, articles that include the adhesive tape, methods of making the adhesive tape, and uses of the adhesive tape are described.

BACKGROUND

Stretch releasable adhesive tapes have been used to bond an article to a substrate. The article is often a hook, clamp, hanger, or caddie and the substrate is often the surface of a wall. The article can be released from the substrate by stretching the adhesive tape.

SUMMARY

An adhesive tape that is stretch releasable, articles that contain the adhesive tape, methods of making the adhesive tape, and uses of the adhesive tape are disclosed. The adhesive tapes include a backing layer that is adjacent to at least one pressure-sensitive adhesive layer. The backing layer typically is optically clear and includes a poly(alkylene) copolymer. The pressure-sensitive adhesive layer is a silicone-based adhesive composition. In many embodiments, the adhesive tape is optically clear.

In a first aspect, an adhesive tape is described. The adhesive tape includes (A) a backing layer and (B) at least one pressure-sensitive adhesive layer that is adjacent to a major surface of the backing layer. The backing layer contains a poly(alkylene) copolymer that is a polymerized product of a reaction mixture that contains (1) a first alkene selected from ethene, propene, or a mixture thereof and (2) a second alkene selected from a 1,2-alkene having 4 to 8 carbon atoms. The backing layer has a haze no greater than 5 percent and a luminous transmittance equal to at least 85 percent as measured using method ASTM D1003-07. The at least one pressure-sensitive adhesive layer contains a silicone-based adhesive composition. The adhesive tape is stretchable at least 50 percent in a first direction without breaking.

In a second aspect, an article is described. In a first embodiment, the article includes a first substrate and an adhesive tape that is adhered to the first substrate. The adhesive tape includes (A) a backing layer, (B) a first pressure-sensitive adhesive layer that is adjacent to a first major surface of the backing layer, and (C) a tab that extends beyond the first substrate. Pulling the tab stretches the adhesive tape and releases the adhesive tape from the first substrate. The adhesive tape is stretchable at least 50 percent in a first direction without breaking. The backing layer contains a poly(alkylene) copolymer that is a polymerized product of a reaction mixture that contains (1) a first alkene selected from ethene, propene, or a mixture thereof and (2) a second alkene selected from a 1,2-alkene having 4 to 8 carbon atoms. The backing layer has a haze no greater than 5 percent and a luminous transmittance equal to at least 85 percent as measured using method ASTM D1003-07. The first pressure-sensitive adhesive layer contains a silicone-based adhesive composition.

In a second embodiment, the article includes a first substrate, a second substrate, and an adhesive tape that is positioned between the first substrate and the second substrate. The adhesive tape couples the first substrate to the second substrate. The adhesive tape includes a (A) a backing layer, (B) a first pressure-sensitive adhesive layer that is adjacent to a first major surface of the backing layer and a second pressure-sensitive adhesive layer that is adjacent to a second major surface of the backing layer, and (C) a tab that extends beyond at least one of the first substrate and the second substrate. Pulling the tab stretches the adhesive tape and releases the adhesive tape from the first substrate, from the second substrate, or from both the first substrate and the second substrate. The adhesive tape is stretchable at least 50 percent in a first direction without breaking when the tab is pulled. The backing layer contains a poly(alkylene) copolymer that is a polymerized product of a reaction mixture that includes (1) a first alkene selected from ethene, propene, or a mixture thereof and (2) a second alkene selected from a 1,2-alkene having 4 to 8 carbon atoms. The backing layer has a haze no greater than 5 percent and a luminous transmittance equal to at least 85 percent as measured using method ASTM D1003-07. The first pressure-sensitive adhesive layer and the second pressure-sensitive adhesive layer each contain a silicone-based adhesive composition.

In a third aspect, a method of coupling and decoupling two substrates is provided. The method includes providing a first substrate and a second substrate. The method further includes positioning an adhesive tape between the first substrate and the second substrate such that the adhesive tape couples the first substrate to the second substrate. The adhesive tape includes (A) a backing layer, (B) a first pressure-sensitive adhesive layer that is adjacent to a first major surface of the backing layer and a second pressure-sensitive adhesive layer that is adjacent to a second major surface of the backing layer, and (C) a tab that extends beyond at least one of the first substrate and the second substrate. The backing layer contains a poly(alkylene) copolymer that is a polymerized product of a reaction mixture that contains (1) a first alkene selected from ethene, propene, or a mixture thereof and (2) a second alkene selected from a 1,2-alkene having 4 to 8 carbon atoms. The backing layer has a haze no greater than 5 percent and a luminous transmittance equal to at least 85 percent as measured using method ASTM D1003-07. The first pressure-sensitive adhesive layer and the second pressure-sensitive adhesive layer each contain a silicone-based adhesive composition. The method further includes pulling on the tab of the adhesive tape to release the adhesive tape from the first substrate, from the second substrate, or from both the first substrate and the second substrate. When pulled, the adhesive tape is stretchable at least 50 percent in a first direction without breaking.

In a fourth aspect, a method of preparing an adhesive tape is provided. The method includes providing a poly(alkylene) copolymer that is a polymerized product of a reaction mixture that includes (1) a first alkene selected from ethene, propene, or a mixture thereof and (2) a second alkene selected from a 1,2-alkene having 4 to 8 carbon atoms. The method further includes casting a backing layer comprising the poly(alkylene) copolymer between a first support layer and a second support layer such that the backing layer has a haze no greater than 5 percent and a luminous transmittance that is at least 85 percent based on ASTM D1003-07. The method yet further includes positioning at least one pressure-sensitive adhesive layer adjacent to a first major surface of the backing layer. The at least one pressure-sensitive adhesive layer contains a silicone-based adhesive composition.

The above summary of the present invention is not intended to describe each embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
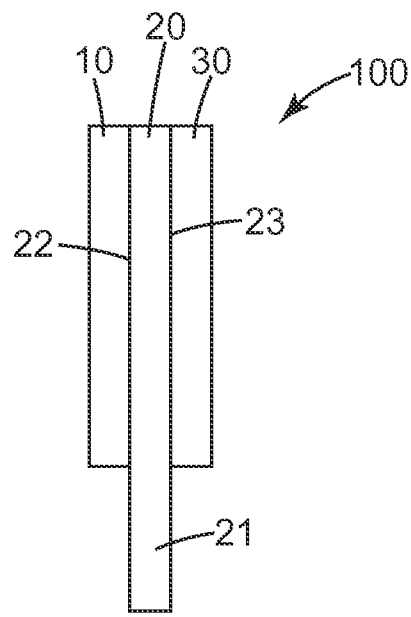
FIG. 1 is a schematic diagram of an exemplary stretch releasable adhesive tape.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

Adhesive tapes, articles containing the adhesive tapes, methods of making the adhesive tapes, and uses of the adhesive tapes are described. More particularly, the adhesive tapes include a backing layer and at least one pressure-sensitive adhesive layer adjacent to a major surface of the backing layer. The backing layer, which contains a poly(alkylene) copolymer, is typically optically clear. In many embodiments, the backing layer plus each pressure-sensitive adhesive layer is optically clear. The at least one pressure-sensitive adhesive layer contains a silicone-based adhesive composition. The adhesive tape can be removed by stretching after being adhered to a substrate.

As used herein, the term "adhesive" and "pressure-sensitive adhesive" are used interchangeably. Likewise, the terms "adhesive layer" and "pressure-sensitive adhesive layer" are used interchangeably. The terms "pressure-sensitive adhesive" and "PSA" are used interchangeably.

As used herein, the term "in the range of" includes the endpoints and all values between the endpoints.

In a first aspect, a stretch releasable adhesive tape is provided. The stretch releasable adhesive tape includes a backing layer and at least one pressure-sensitive adhesive layer adjacent to the backing layer. In some embodiments, the stretch releasable adhesive tape includes a single pressure-sensitive adhesive layer positioned adjacent to (e.g., adhered to) a first major surface of the backing layer. Such a stretch releasable adhesive tape can be placed on (e.g., adhered to) the outer surface of a substrate for any desired purpose. For example, the adhesive tape can provide a protective function and can be removed later if the protection is no longer needed or desired.

In other examples, the adhesive tape can provide a writable or printable surface (e.g., the writing or printing can be on the backing layer). In some more specific examples, the adhesive tape can function as a label or price sticker that can be removed when no longer needed.

In other embodiments, the adhesive tape includes two pressure-sensitive adhesive layers that are positioned adjacent to (e.g., adhered to) opposite major surfaces of the backing layer. An adhesive tape with two pressure-sensitive adhesive layers can be used to couple two substrates together. If at any later time it is desirable to separate the first substrate from the second substrate, the adhesive tape can be stretched for removal (e.g., stretched to release the adhesive tape from the first substrate, from the second substrate, or from both the first and second substrates). The two substrates often can be separated without damaging either substrate. After separation from the adhesive tape and each other, the substrates can be used again. This is particularly advantageous when at least one of the substrates is expensive, fragile, or difficult to manufacture.

An exemplary stretch releasable adhesive tape construction with two pressure-sensitive adhesive layers is shown schematically in FIG. 1. The adhesive tape 100 includes a backing layer 20 that is positioned between two pressure-sensitive adhesive layers 10 and 30. The first adhesive layer 10 is adjacent to a first major surface 22 of the backing layer 20 and the second adhesive layer 30 is adjacent to the second major surface 23 of the backing layer 20. The first major surface 22 of the backing layer 20 is opposite the second major surface 23 of the backing layer 20. As shown in FIG. 1, the first adhesive layer 10 and the second adhesive layer 30 both contact the backing layer 20 and are directly adhered to the backing layer 20. In other embodiments that are not illustrated, the first adhesive layer 10 and the second adhesive layer 30 are indirectly adhered to the backing layer 20 through one or more intervening layers such as a primer layer. The backing layer 20 extends beyond both the first adhesive layer 10 and the second adhesive layer 30. The region of the backing layer 21 that extends beyond the adhesive layers can function as a tab 21. In FIG. 1, the tab 21 is a part of the backing layer or an extension of the backing layer.

Figure 2:
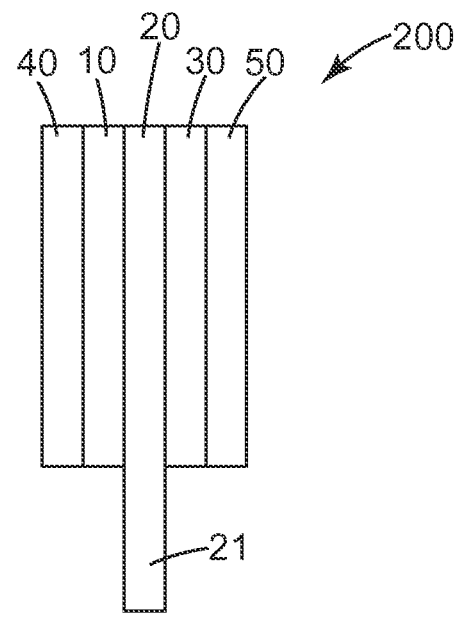
FIG. 2 is a schematic diagram of an exemplary article that includes two substrates coupled together using the stretch releasable adhesive tape exemplified in FIG. 1.

FIG. 2 is exemplary schematic diagram of an article 200 that includes two substrates coupled using the stretch releasable adhesive tape shown schematically in FIG. 1. The stretch releasable adhesive tape is positioned between a first substrate 40 and a second substrate 50. That is, the article 200 includes in the following order a first substrate 40, a first adhesive layer 10, a backing layer 20, a second adhesive layer 30, and a second substrate 50. The first adhesive layer 10 adheres to the first substrate 40 and the second adhesive layer 30 adheres to the second substrate 50. The pressure-sensitive adhesive layer typically can be adhered to a substrate with no more than finger pressure and can remain adhered to the substrate until the adhesive tape is stretched for removal. The first substrate 40 is coupled to the second substrate 50 through the adhesive tape.

In FIG. 2, the backing layer 20 extends beyond both the first adhesive layer 10 and the second adhesive layer 30. The region of the backing layer that extends beyond both the first adhesive layer 10 and the second adhesive layer 30 can function as a tab 21 for stretch releasing the adhesive tape from both substrates 40 and 50. By pulling on the tab 21 and stretching the adhesive tape, the first adhesive layer 10 can be released from the first substrate 40, the second adhesive layer 30 can be released from the second substrate 50, or both adhesive layers 10 and 30 can be released from both substrates 40 and 50. The combined release allows the separation of the first substrate from the second substrate and the removal of the adhesive tape from between the first substrate and the second substrate.

Figure 3:
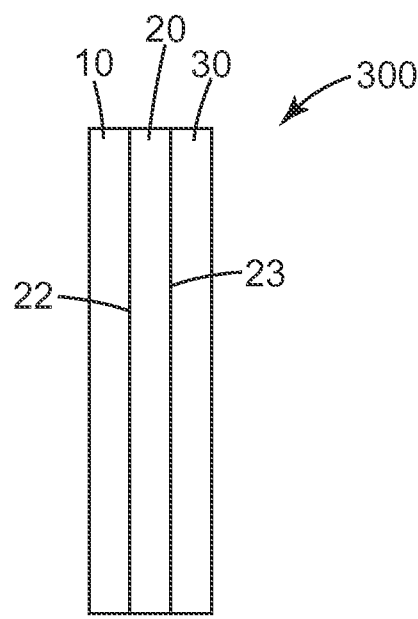
FIG. 3 is a schematic diagram of another exemplary stretch releasable adhesive tape.
Figure 4:
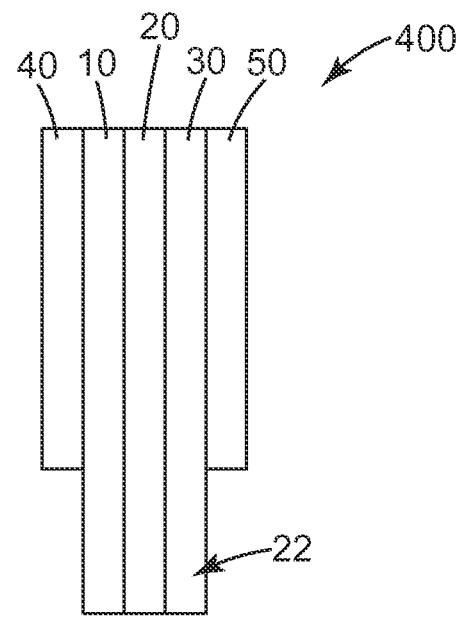
FIG. 4 is a schematic diagram of another exemplary article that includes two substrates coupled together using the optically clear, stretch releasable adhesive tape exemplified in FIG. 3.

Another stretch releasable adhesive tape 300 is shown schematically in FIG. 3 that includes a backing layer 20 plus two pressure-sensitive adhesive layers 10 and 30. In this embodiment, the backing layer 20 does not extend beyond both the first adhesive layer 10 and the second adhesive layer 30. The use of this adhesive tape to couple a first substrate 40 and a second substrate 50 is shown schematically in FIG. 4. A region of the adhesive tape (layers 10, 20, and 30) extends beyond both substrates 40 and 50. The region of the adhesive tape that extends beyond both substrates 40 and 50 can function as the tab 24. The tab 24 is tacky because the outer surfaces are the adhesive layers 10 and 30. Alternatively, an additional layer (not shown in FIG. 3) such as a film or another non-tacky layer such as talc or ink (printed) can be placed over the adhesive layers 10 and 30 in the region of the tab to provide a non-tacky surface. By pulling on the tab 24 and stretching the adhesive tape, the first adhesive layer 10 can be released from the first substrate 40, the second adhesive layer 30 can be released from the second substrate 50, or both adhesive layers 10 and 30 can be released from both substrates 40 and 50. The combined release allows the separation of the first substrate from the second substrate and the removal of the adhesive tape (layers 10, 20, and 30) between the first substrate 40 and the second substrate 50.

With an adhesive tape, releasing the adhesive from one or both substrates includes pulling on a tab and stretching. The tab extends beyond at least one of the substrates. The tab can a part of the backing layer (i.e., an extension of the backing layer), a part of at least one adhesive layer (i.e., an extension of the adhesive layer), attached to the backing layer, attached to at least one adhesive layer, or a part of both the backing layer and at least one adhesive layer (i.e., an extension of both the backing layer and at least one adhesive layer). At least one substrate does not contact the adhesive layer in the region of the tab. Generally, if there are two substrates in the article, both substrates do not contact the adhesive layer in the region of the tab. The tab is usually pulled in a direction that is parallel to or substantially parallel to the surfaces of the substrates. That is, the tab is pulled in a direction that is 0 degrees, less than 5 degrees, less than 10 degrees, less than 15 degrees, less than 20 degrees, less than 25 degrees, less than 30 degrees, or less than 35 degrees. The tab often includes a part of the backing layer. In some embodiments, the tab is formed from a second region of the backing layer that extends beyond a first region of the backing layer that is in contact with the adhesive layers. The tab is often non-tacky in these embodiments. In other embodiments, the tab includes the backing layer and at least one of the adhesive layers. The tab is often tacky in these embodiments. A tacky tab can be made non-tacky by covering the tab region with a non-tacky material.

The adhesive layers as well as backing layer of the adhesive tape are typically highly extensible. Pulling on the tab causes the adhesive tape to elongate or stretch. Stretching reduces the volume of the adhesive tape in the region between the first substrate and the second substrate and facilitates release of the adhesive tape from one or both substrates. Pulling on the tab can release the adhesive layers from both substrates if the adhesive layers have sufficient cohesive strength, if the adhesive layers adhere more strongly to the backing layer than to the substrates, and if the adhesive tape can be elongated sufficiently to reduce its volume between the substrates without breaking or snapping back into its original position or dimensions. The stretched adhesive tape can be removed from between the two substrates, the two substrates can be separated, or both. The adhesive tape typically can be stretched at least 50 percent in a first direction (often the first direction is lengthwise and the length can be increased at least 50 percent) without breaking or snapping under the stretch releasing conditions.

The backing layers shown schematically in FIG. 1 and FIG. 3 typically are optically clear. In many embodiments, the adhesive layers and the stretch releasable adhesive tape (i.e., the backing layer plus each pressure-sensitive adhesive layer) are also optically clear. As used herein, the term "optically clear" refers to a backing layer, an adhesive layer, or an adhesive tape that has a luminous transmittance of at least 85 percent and a haze no greater than 5 percent as measured using the method ASTM D1003-07. With this method, measurements are made in the 400 to 700 nanometer wavelength range. The luminous transmittance is often equal to at least 88 percent, at least 90 percent, at least 91 percent, at least 92 percent, or at least 93 percent. The haze is often no greater than 4, no greater than 3, no greater than 2, or no greater than 1. Some exemplary adhesive tapes have a haze no greater than 3 percent and a luminous transmittance equal to at least 85 percent as measured using method ASTM D1003-07. Other exemplary adhesive tapes have a haze no greater than 2 percent and a luminous transmittance equal to at least 85 percent as measured using method ASTM D1003-07. Not all materials that are visibly clear are considered to be optically clear. That is, visible clarity is not always synonymous with optical clarity. A material that is visibly clear can have a haze value greater than 5, a luminous transmittance value less than 85 percent, or both.

In some articles, the stretch releasable adhesive tape is optically clear. That is, the backing layer plus each pressure-sensitive adhesive layer is optically clear. The optically clear adhesive tape can be positioned between two substrates such that the second substrate is visible when viewed through both the first substrate and the optically clear adhesive tape. If the adhesive tape is optically clear, the second substrate 50 in FIGS. 2 and 3 often can be viewed by looking through the first substrate 40 and the adhesive tape (as shown, the adhesive tape corresponds to layers 10, 20, and 30). For example, the optically clear adhesive tape can be used to couple a first substrate such as an optically clear substrate (e.g., a cover lens) to a second substrate such as a display (e.g., a liquid crystal display). If the coupling is not defective, the optically clear adhesive tape remains positioned between the first substrate and the display. If the coupling is defective, however, the adhesive tape can be removed without damaging the display by stretching. The adhesive tape can be replaced and the first substrate and the display can be coupled again with another optically clear, stretch releasable adhesive tape.

In addition to being optically clear, the backing layer is selected to have suitable mechanical properties for use in a stretch release adhesive tape. For example, the backing layer is selected so that it can be stretched (elongated) when pulled in a first direction (e.g., a lengthwise direction) at least 50 percent without breaking. That is, at least one dimension such as the length can be increased at least 50 percent through stretching without breaking the backing layer. In some embodiments, the backing layer can be stretched at least 100 percent, at least 150 percent, at least 200 percent, at least 300 percent, at least 400 percent, or at least 500 percent without breaking. The backing layer can often be stretched up to 1200 percent, up to 1000 percent, up to 800 percent, up to 750 percent, or up to 700 percent without breaking. These relatively large elongation values facilitate stretch releasing of the adhesive tape after being adhered to a substrate.

The Young's Modulus of the backing layer can be an indicator of the resistance of the backing layer to stretching. The Young's Modulus is often in the range of about 10 MPa to about 75 MPa. For example, the Young's Modulus can be in the range of 20 to 75 MPa, in the range of 20 to 60 MPa, in the range of 20 to 50 MPa, or in the range of 25 to 50 MPa. The Young's Modulus can be measured, for example, using method ASTM D790-07 or ASTM D882-02.

The tensile strength of the backing layer is an indicator of the load that the backing layer can sustain without breaking and is an indicator of how far the backing layer can be stretched without breaking. The tensile strength is typically in the range of about 10 MPa to about 60 MPa or higher. For example, the tensile strength can be in the range of 10 to 60 MPa, in the range of 10 to 50 MPa, in the range of 20 to 60 MPa, in the range of 20 to 55 mPa, or in the range of 25 to 50 MPa. The tensile strength can be measured using method ASTM D882-02.

The backing layer 20 that contain a poly(alkylene) copolymer can have the desired combination of optical clarity and mechanical properties. Suitable poly(alkylene) copolymers are a polymerized product a reaction mixture that includes (1) a first alkene selected from ethene, propene, or a mixture thereof and (2) a second alkene selected from a 1,2-alkene having 4 to 8 carbon atoms. In many poly(alkylene) copolymers, the 1,2-alkene is selected from butene, hexene, or octane. More particularly, many suitable poly(alkylene) copolymers are prepare from reaction mixtures that contain ethene and butane, ethene and hexene, or ethene and octane. The poly(alkylene) copolymers can be random copolymers or block copolymers. These copolymers are typically prepared using a metallocene catalyst. Multiple different poly(alkylene) copolymers can be included in the backing layer.

Not all poly(alkylene) copolymers are suitable for preparation of the backing layer. That is, not all known poly(alkylene) copolymers can be used to provide a backing layer having the combination of suitable mechanical and optical properties. Many poly(alkylene) copolymers with suitable mechanical properties do not have low haze (i.e., no greater than 5 percent as measured using method ASTM D1003-07) and high luminous transmittance (i.e., at least 85 luminous transmittance as measured using ASTM D1003-07) that is usually needed to prepare an optically clear backing layer. For example, the relatively large crystalline size of many poly (alkylene) copolymers, the use of various additives in many commercially available poly(alkylene) copolymers, and the specific methods used to form films of the poly(alkylene) copolymer can make then unsuitable for use as the backing layer.

The poly(alkylene) copolymer in the backing layer preferably has some crystalline material rather than being completely amorphous. The crystalline material tends to add strength to the backing layer by functioning as a physical crosslinker. If the size of the crystalline material is too large, however, the haze of the backing layer can be unacceptably large. The crystalline material preferably has a size that is less than a wavelength of visible light. In many embodiments of suitable poly(alkylene) copolymers, at least 95 percent of the crystalline material has a crystalline size less than 400 nanometers. For example, at least 95 percent of the crystalline material can have a crystalline size less than 300 nanometers, less than 200 nanometers, or less than 100 nanometers. A small crystalline size facilitates the formation of a backing layer that is optically clear.

Backing layers with crystalline material smaller than 400 nanometers can be prepared using various methods. In one method, the poly(alkylene) copolymers used to form the backing layer are melted, extruded, and quenched rapidly so that the alignment and growth of the crystals is minimized. In another method, seed materials (i.e., nucleating agents) can be added that facilitate the formation of many crystals within the copolymer upon cooling to form the solidified film. The formation of more crystals tends to favor smaller crystalline sizes. In yet another method, the copolymer composition is varied to alter the crystalline size. A greater amount of the second alkene monomer having 4 to 8 carbon atoms tends to result in a smaller crystalline size. The density or specific gravity tends to decrease as the amount of the second alkene monomer increases. The specific gravity is often no greater than 0.91. For example, the specific gravity is often no greater than 0.90 or no greater than 0.89. The specific gravity is often in the range of 0.86 to 0.91, in the range of 0.87 to 0.90, or in the range of 0.88 to 0.90.

The backing layer preferably is free or substantially free of additives that contribute to the haze or that lower the luminous transmittance. For example, the backing layer typically does not include an anti-blocking agent, a slip agent, or both. That is, the backing layer is usually free or substantially free of an anti-blocking agent, slip agent, or both. As used herein, the term "substantially free" with reference to the anti-blocking agent or to the slip agent means that these agents are each present in an amount no greater than 0.5 weight percent, no greater than 0.3 weight percent, no greater than 0.2 weight percent, no greater than 0.1 weight percent, no greater than 0.05 weight percent, or no greater than 0.01 weight percent. Anti-blocking agents are often added when films are prepared from poly(alkylene) copolymers to prevent the film from sticking to itself such as when formed into a roll. Exemplary anti-blocking agents include, but are not limited to, particles such as diatomaceous earth and talc. Slip agents are often added to reduce friction such as film-to-film friction in a roll or film-to-production equipment friction. The presence of these slip agents also can interfere with good adhesion to the at least one pressure-sensitive adhesive layer. Many commonly used slip agents are primary amides such as those made from long chain fatty acids by amidation. Examples of slip agents include, but are not limited to, stearamide, oleamide, and erucamide.

In many embodiments, the backing layer contains at least 99 percent poly(alkylene) copolymer. For example, the backing layer contains at least 99.1 weight percent, at least 99.2 weight percent, at least 99.3 weight percent, at least 99.4 weight percent, at least 99.5 weight percent, at least 99.6 weight percent, at least 99.7 weight percent, at least 99.8 weight percent, or at least 99.9 weight percent poly(alkylene) copolymer.

Exemplary poly(alkylene) copolymers that can be used to prepare optically clear backing layers are commercially available under the trade designation EXACT (e.g., EXACT 3024, 3040, 4011, 4151, 5181, and 8210) and VISTAMAXX (e.g., VISTAMAXX 6202, 6102, and 3000) from Exxon Mobil Chemical (Houston, Tex.). Other exemplary poly(alkylene) copolymers are commercially available under the trade designations AFFINITY (e.g., AFFINITY PT 1845G, PL 1845G, PF 1140G, PL 1850G, and PL 1880G), ENGAGE (e.g., ENGAGE 8003), and INFUSE (e.g., INFUSE D9530.05) from Dow Chemical (Midland, Mich.).

Many commercially available poly(alkylene) copolymers are the reaction product of ethene with a second alkene selected from butene, hexene, or octene. EXACT 3024 and EXACT 4011 are ethylene-butene copolymers. EXACT 3040 and EXACT 4151 are ethylene-hexene copolymers. EXACT 8210, EXACT 5181, ENGAGE 8003, and INFUSE D9530.05 are ethylene-octene copolymers.

The poly(alkylene) copolymers can be blended with other polymeric materials as long as the resulting backing layer is optically clear. Suitable blended copolymers are often ethylene copolymers such as, for example, ethylene vinyl acetate and ethylene methyl acrylate. The blended copolymers are typically selected to be miscible with the poly(alkylene) copolymers, to be optically clear, to be free or substantially free of additives that can contribute to the haze or that lower the luminous transmittance, and to be suitable for use in the processes described above for formation of the backing layer. As used herein, "substantially free" with reference to the additives in the blended copolymer means that these additives are present in an amount no greater than 0.5 weight percent, no greater than 0.4 weight percent, no greater than 0.3 weight percent, no greater than 0.2 weight percent, or no greater than 0.1 weight percent. The backing layer can contain, for example, up to 50 weight percent, up to 40 weight percent, up to 30 weight percent, up to 20 weight percent, or up to 10 weight percent of the blended copolymer.

In addition to choosing suitable materials that will result in backing layers with low haze and high luminous transmittance, the method of preparing the backing layer if often selected to maintain these values. That is, the method of making the backing layer is typically selected to provide a relatively smooth surface and a relatively uniform thickness. If the surface is roughened, the percent haze may become undesirably large. If the thickness is not relatively uniform, the luminous transmittance may be undesirably non-uniform. To provide suitable optical clarity, a process can be used to provide a thickness that is relatively uniform across the backing layer in any direction. For example, thickness often varies by less than 10 percent, less than 8 percent, less than 6 percent, or less than 5 percent across the backing layer in any direction. More specifically, a backing layer having an average thickness of 4 mils (0.1 millimeter or 100 micrometers) has a thickness variation of less than 10 micrometers, less than 8 micrometers, less than 6 micrometers, or less than 5 micrometers across the backing layer in any direction.

Many conventional methods used to form films of poly (alkylene) copolymers are not suitable because the resulting films do not have the requisite smoothness. For example, blowing methods are usually not suitable because anti-blocking agents or slip agents are typically added. The addition of these agents often tends to roughen the surface of the resulting film. Cast extrusion methods that impart a rough surface to the film in an attempt to minimize contact with a chill roller are typically not suitable.

Various methods can be used to prepare backing layers with suitable smoothness and thickness uniformity. In a first example, the poly(alkylene) copolymers can be cast between two smooth support layers such as release liners or between a smooth support layer and a smooth roller. No blocking agent or slip agent is needed and the absence of these agents is preferable. The support layers (e.g., release liners) tend to reinforce the resulting rubbery backing layer and allow the backing layer to be subjected to further processing without distortion or stretching. Further, the support layers tend to protect the surface until it is combined with the at least one pressure-sensitive adhesive layer.

More specifically, the poly(alkylene) copolymer can be extruded as a molten film using, for example, a flat cast extrusion die. The extrusion temperature can be in the range of about 150° C. to 200° C. The extruded film of poly(alkylene) copolymer can be extruded between two support films. The resulting construction of support film/poly(alkylene) copolymer film/support film can then be passed through a chilled roll stack to cool and solidify the poly(alkylene) copolymer film. Backing films that are prepared using this method tend to have a relatively uniform thickness and to be relatively smooth.

Any suitable support surface can be used for forming the backing layer. In many embodiments, the support is a release liner. Any suitable release liner can be used. Suitable release liners are typically paper (e.g., Kraft paper) or polymeric films. In many applications, polymeric films are preferred. Polymeric films used as release liners can be formed, for example, from polyester such as polyethylene terephthalate or polyolefins such as polyethylene, polypropylene, or combinations thereof. The surface of the release liners can be optionally treated with a release agent such as a silicone, a fluorochemical such as a fluorosilicone, or other low surface energy materials such as a polyolefin (e.g., polyethylene, polypropylene, or low density polyethylene). An exemplary fluorosilicone is commercially available from Dow Corning under the trade designation SYL-OFF (e.g., SYL-OFF Q2-7785 or SYL-OFF Q2-7786). Other release liners include, for example, are commercially available under the trade designation CLEARSIL (e.g., CLEARSIL T10 or T50) from CPI Films (St. Louis, Mo.) and under the trade designation LOPAREX (e.g., LOPAREX 5100) from Loparex (Willowbrook, Ill.). Suitable release liners and methods for treating liners are further described in, for example, U.S. Pat. No. 4,472,480 (Olson), U.S. Pat. No. 4,980,443 (Kendziorski), and U.S. Pat. No. 4,736,048 (Brown et al.), U.S. Pat. No. 5,578,381 (Hamada et al.), and U.S. Pat. No. 5,082,706 (Tangney); and U.S. Patent Application Publication 2008/0280086 (Sheridan et al.).

The thickness of the backing layer is often selected based on the desired stretch release force. A greater stretch release force is usually needed as the thickness of the backing layer is increased. Conversely, a lower stretch release force is needed as the thickness of the backing layer is decreased. The thickness of the backing layer can be, for example, up to 40 mils (1.0 millimeter or 1000 micrometers). As used herein, the term "mil" refers to 0.001 inch and 1 mil is equal to about 0.0025 centimeters or about 0.025 millimeters or about 25 micrometers. In many embodiments, the thickness is up to 30 mils (750 micrometers), up to 20 mils (500 micrometers), up to 10 mils (250 micrometers), up to 8 mils (200 micrometers), up to 6 mils (150 micrometers), or up to 5 mils (125 micrometers). The thickness is often at least 1 mil (0.025 millimeters or 25 micrometers), at least 2 mils (50 micrometers), at least 3 mils (75 micrometers), or at least 4 mils (100 micrometers). Some suitable backing layers have a thickness in the range of 1 mil (25 micrometers) to 20 mils (500 micrometers), in the range of 1 mil (25 micrometers) to 10 mils (250 micrometers), in the range of 1 mil (25 micrometers) to 8 mils (200 micrometers), in the range of 1 mil (25 micrometers) to 7 mils (175 micrometers) in the range of 2 mils (50 micrometers) to 8 mils (200 micrometers), in the range of 3 mils (75 micrometers) to 6 mils (150 micrometers), or in the range of 4 mils (100 micrometers) to 5 mils (125 micrometers).

As prepared, the backing layer is usually a rubbery material with a relatively smooth surface and with a relatively uniform thickness. In many embodiments, the backing layer is slightly tacky. A pressure-sensitive adhesive layer can be positioned adjacent to at least one major surface of the backing layer. In many embodiments, a first pressure-sensitive adhesive layer is positioned adjacent to a first major surface of the backing layer and a second pressure-sensitive adhesive layer is positioned adjacent to a second major surface of the backing layer. The second major surface of the backing layer is the surface opposite the first major surface. As used herein, the term "adjacent" with reference to the pressure-sensitive adhesive layer and the backing layer means that the pressure-sensitive adhesive layer contacts the backing layer or is separated from the backing layer by one or more intervening layers. That is, each pressure-sensitive adhesive layer is adhered directly or indirectly to the backing layer.

The backing layer can be subjected to a priming treatment prior to being positioned adjacent to the at least one pressure-sensitive adhesive layer. The primer treatment tends to increase adhesion between the backing layer and the pressure-sensitive adhesive layer. This increased adhesion is often desirable for a stretch releasing adhesive tape. That is, it is usually desirable that the adhesion of the pressure-sensitive adhesive layer to the backing layer is stronger than the adhesion of the pressure-sensitive adhesive layer to the substrate. Any suitable priming treatment known in the art can be used. For example, the priming treatment can include treatment with a chemical primer composition, treatment with a corona discharge or plasma discharge, exposure to an electron beam or ultraviolet light, etching with an acidic composition, or combinations thereof.

In some embodiments, the primer treatment includes applying a primer composition to a surface of the backing layer. Any suitable primer composition can be used. The primer composition can include, for example, a reactive chemical adhesive promoter (e.g., the components can react with the backing layer, the adhesive layer, or both). Exemplary primer compositions include those described in U.S. Pat. No. 5,677,376 (Groves), incorporated herein by reference in its entirety. That is, the primer composition can include a blend of (1) a block copolymer such as styrene-ethylene/butylene-styrene block copolymer that is modified with maleic acid or maleic anhydride and (2) the polymeric reaction product of monovalent monomer mixture that includes (a) at least one alkyl(meth)acrylate ester of a non-tertiary alcohol having 1 to 14 carbon atoms and (b) at least one nitrogen-containing monomer. The block copolymer can be, for example, those commercially available from Shell Chemical Co. under the trade designation KRATON FG-1901X. Other suitable primer compositions include those commercially available under the trade designation NEO-REZ (NEOREZ R551) from DSM NeoResins (Wilmington, Mass.). This primer composition contains waterborne polyurethane.

At least one pressure-sensitive adhesive layer is adhered directly or indirectly to a major surface of the backing layer. In many embodiments of the adhesive tape, there are two pressure-sensitive adhesive layers positioned on opposite major surfaces of the backing layer. As used in the art, the term "pressure-sensitive adhesive" refers to adhesive compositions that have (1) aggressive and persistent tack, (2) adherence with no more than finger pressure, (3) sufficient ability to hold onto an adherend, and (4) sufficient cohesive strength to be cleanly removable from the adherend.

The compositions included in the pressure-sensitive adhesive layers are typically formulated to provide the requisite viscoelastic properties to achieve the desired balance of tack, peel adhesion, and shear holding power. More specifically, the composition of each of the pressure-sensitive adhesive layers is typically chosen so that the Young's modulus is less than that of the backing layer. If the Young's modulus of each adhesive layer is less than that of the backing layer, the adhesive layer will yield during the deformation of the backing layer during stretch release and the backing layer is less likely to tear.

Additionally, the composition of each of the adhesive layers is often chosen so that the percent elongation at break is greater than that of the backing layer. If this condition is met, the adhesive layer is less likely to leave residue on the substrates upon being released from the substrates. That is, like the backing layer, the adhesive tape is stretchable at least 50 percent in a first direction without breaking when the tab is pulled. In some embodiments, the adhesive tape with ether one or two pressure-sensitive adhesive layers can be stretched at least 100 percent, at least 150 percent, at least 200 percent, at least 300 percent, at least 400 percent, or at least 500 percent without breaking. The adhesive tape can often be stretched up to 1200 percent, up to 1000 percent, up to 800 percent, up to 750 percent, or up to 700 percent without breaking. These relatively large elongation values facilitate stretch releasing of the adhesive tape after being adhered to a substrate.

The at least one pressure-sensitive adhesive layer includes a silicone-based adhesive composition. The term "silicone-based" as used herein refers to macromolecules (e.g., polymer of copolymer) that contain silicone units. As used herein, the term "copolymer" refers to a polymeric material having more than one type of repeat units. The terms silicone or siloxane are used interchangeably and refer to a siloxane ($—Si(R^1)_2O—$) repeating unit where $R^1$ is defined below or to a compound having these units. In many embodiments, $R^1$ is an alkyl (e.g., methyl or ethyl) or an aryl (e.g., phenyl). The silicone-based adhesive compositions include a silicone material that is selected from a silicone elastomer, silicone gum, or a mixture thereof. As used herein, the phrase "silicone elastomer and/or gum" is used interchangeably with the phrase "silicone elastomer, silicone gum, or a mixture thereof. Both of these phrases mean that either or both of a silicone elastomer and silicone gum can be present in the adhesive composition.

The silicone elastomer and/or gum often contains at least one polydiorganosiloxane unit. The silicone elastomer and/or gum can be a linear polymer or copolymer. Alternatively, the silicone elastomer and/or gum can be cured (i.e., covalently crosslinked). The adhesive composition many contain other optional components such as tackifying resins. That is, the silicone-based adhesive compositions may contain (a) a silicone material selected from a silicone elastomer, a silicone gum, or a mixture thereof and (b) a tackifying resin. The terms "elastomer" and "elastomeric material" are used interchangeably.

Exemplary silicone elastomers include, but are not limited to, urea-based silicone copolymers, oxamide-based silicone copolymers, amide-based silicone copolymers, urethane-based silicone copolymers, and mixtures thereof. Exemplary cured elastomers include, but are not limited to, cured urea-based silicone copolymers, cured oxamide-based silicone copolymer, cured amide-based silicone copolymers, cured urethane-based silicone copolymers, and mixtures thereof. Suitable silicone gums include, but are not limited to, polydimethylsiloxane gums. Exemplary cured silicone gums include, but are not limited to, cured polydimethylsiloxane gums.

The term "urea-based" as used herein refers to macromolecules that are segmented copolymers which contain at least one urea linkage. The term "amide-based" as used herein refers to macromolecules that are segmented copolymers which contain at least one amide linkage. The term "urethane-based" as used herein refers to macromolecules that are segmented copolymers which contain at least one urethane linkage.

The term "alkyl" refers to a monovalent group that is a radical of an alkane, which is a saturated hydrocarbon. The alkyl can be linear, branched, cyclic, or combinations thereof and typically has 1 to 20 carbon atoms.

The term "haloalkyl" refers to an alkyl having at least one hydrogen atom replaced with a halo. The term "halo" refers to fluoro, chloro, bromo, or iodo. Some haloalkyl groups are fluoroalkyl groups, chloroalkyl groups, and bromoalkyl groups. The term "perfluoroalkyl" refers to an alkyl group in which all hydrogen atoms are replaced by fluorine atoms.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms.

The term "aralkyl" refers to an alkyl group that is substituted with an aryl group. Suitable aralkyl groups often have an alkyl group with 1 to 10 carbon atoms and an aryl group with 6 to 12 carbon atoms.

The term "aryl" refers to a monovalent group that is aromatic and carbocyclic. The aryl can have one to five rings that are connected to or fused to the aromatic ring. The other ring structures can be aromatic, non-aromatic, or combinations thereof.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are divalent radicals of poly(oxyalkylenes) where the heteroatom is oxygen. An exemplary heteroalkylene is a divalent radical of a poly(oxyethylene) of formula —CH$_2$CH$_2$(OCH$_2$CH$_2$)$_n$OCH$_2$CH$_2$— where n is equal to at least 1.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, or nitrogen.

The term "aralkylene" refers to a divalent group of formula —R$^a$—Ar$^a$— where R$^a$ is an alkylene and Ar$^a$ is an arylene (i.e., an alkylene is bonded to an arylene).

One example of a useful class of silicone elastomers is urea-based silicone polymers such as silicone polyurea block copolymers. Silicone polyurea block copolymers are the reaction product of a polydiorganosiloxane diamine (also referred to as a silicone diamine), a polyisocyanate, and an optional organic polyamine. As used herein, the term "polyisocyanate" refers to a compound having more than one isocyanate group. As used herein, the term "polyamine" refers to a compound having more than one amino group (e.g., primary amino group, secondary amino group, or combination thereof).

Suitable silicone polyurea block copolymers are represented by the repeating unit of Formula (I) with a urea linkage of formula —NH—(CO)—ND-.

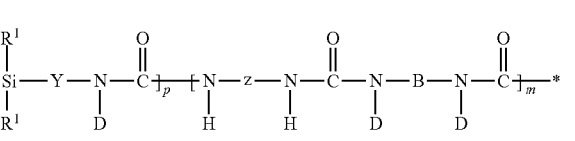

In Formula (I), each R$^1$ is independently an alkyl, haloalkyl, alkenyl, aralkyl, aryl, or aryl substituted with an alkyl, alkoxy, or halo. Suitable alkyl groups for R$^1$ in Formula (III) typically have 1 to 10 carbon atoms, 1 to 6 carbon atoms, or 1 to 4 carbon atoms. Exemplary alkyl groups include, but are not limited to, methyl, ethyl, isopropyl, n-propyl, n-butyl, and iso-butyl. Suitable haloalkyl groups for R$^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for R$^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for R$^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for R$^1$ often have an alkyl group having 1 to 10 carbon atoms that is substituted with an aryl group having 6 to 12 carbon atoms. Exemplary aralkyl groups include an alkyl group having 1 to 10 carbon atoms, 1 to 6 carbon atoms, or 1 to 4 carbon atoms that is substituted with a phenyl group.

In many embodiments, at least 50 percent of the R$^1$ groups are methyl. For example, at least 60 percent, at least 70 percent, at least 80 percent, at least 90 percent, at least 95 percent, at least 98 percent, or at least 99 percent of the R$^1$ groups can be methyl. The remaining R$^1$ groups can be selected from an alkyl having at least two carbon atoms, haloalkyl, aralkyl, alkenyl, aryl, or aryl substituted with an alkyl, alkoxy, or halo. For example, all the R$^1$ groups can be an alkyl (e.g., methyl or ethyl) or an aryl (e.g., phenyl).

Each group Z in Formula (I) is independently an arylene, aralkylene, or alkylene. Exemplary arylenes have 6 to 20 carbon atoms and exemplary aralkylenes have 7 to 20 carbon atoms. The arylenes and aralkylenes can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). The alkylenes can be linear branch, cyclic, or combinations thereof and can have 1 to 20 carbon atoms. In some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene, and mixtures thereof.

Each Y in Formula (I) is independently an alkylene, an aralkylene, an arylene, or a combination thereof. Exemplary alkylenes, which can be linear, branched, or combinations thereof, often have 1 to 10 carbon atoms, 1 to 6 carbon atoms, or 1 to 4 carbon atoms. Exemplary arylenes often have 6 to 20 carbon atoms, 6 to 12 carbon atoms, or 6 carbon atoms (i.e., phenylene). Exemplary aralkylenes often have 7 to 20 carbon atoms, 7 to 18 carbon atoms, 7 to 12 carbon atoms. Aralkylene often include a phenylene group attached to an alkylene having 1 to 12 carbon atoms, 1 to 10 carbon atoms, or 1 to 6 carbon atoms.

Each D is selected from hydrogen, an alkyl (e.g., an alkyl having 1 to 10 carbon atoms, 1 to 6 carbon atoms, or 1 to 4 carbon atoms), an aryl having 6 to 12 carbon atoms (e.g., phenyl), or a radical that completes a ring structure including B or Y to form a heterocycle. Each D is often hydrogen or an alkyl group.

Group B is selected from an alkylene (e.g., an alkylene having 1 to 10 carbon atoms, 1 to 6 carbon atoms, or 1 to 4 carbon atoms), aralkylene, arylene such as phenylene, or heteroalkylene. Examples of heteroalkylenes include divalent radicals of polyethylene oxide (also called poly(oxyethylene)), polypropylene oxide (also called poly(oxypropylene)), polytetramethylene oxide (also called poly(oxytetramethylene)), and copolymers and mixtures thereof.

The variable m is a number that is 0 to about 1000; p is a number that is at least 1; and n is a number in the range of 0 to 1500. Each asterisk (*) indicates a site of attachment of the repeat unit to another group in the copolymer such as, for example, another repeat unit of Formula (I).

Useful silicone polyurea block copolymers are disclosed in, e.g., U.S. Pat. No. 5,512,650 (Leir et al.), U.S. Pat. No. 5,214,119 (Leir et al.), U.S. Pat. No. 5,461,134 (Leir et al.), U.S. Pat. No. 6,407,195 (Sherman et al.), U.S. Pat. No. 6,441,118 (Sherman et al.), U.S. Pat. No. 6,846,893 (Sherman et al.), and U.S. Pat. No. 7,153,924 (Kuepfer et al.) as well as in PCT Publication No. WO 97/40103 (Paulick et al.).

Examples of useful silicone diamines that can be used in the preparation of silicone polyurea block copolymers include polydiorganosiloxane diamines represented by Formula (II)

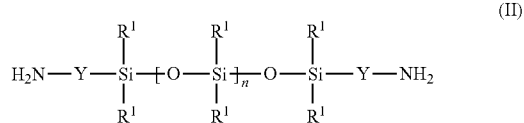

(II)

In Formula (II), each $R^1$ is independently an alkyl, haloalkyl, aralkyl, alkenyl, aryl, or aryl substituted with an alkyl, alkoxy, or halo as defined above for Formula (I). Each Y is independently an alkylene, arylene, or aralkylene as defined above for Formula (I). The variable n is an integer of 0 to 1500.

The polydiorganosiloxane diamine of Formula (II) can be prepared by any known method and can have any suitable molecular weight, such as a weight average molecular weight in the range of 700 to 150,000 grams per mole. Suitable polydiorganosiloxane diamines and methods of making the polydiorganosiloxane diamines are described, for example, in U.S. Pat. No. 3,890,269 (Martin), U.S. Pat. No. 4,661,577 (Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.). Some polydiorganosiloxane diamines are commercially available, for example, from Shin Etsu Silicones of America, Inc. (Torrance, Calif.) and from Gelest Inc. (Morrisville, Pa.).

A polydiorganosiloxane diamine having a molecular weight greater than 2,000 grams per mole or greater than 5,000 grams per mole can be prepared using the methods described in U.S. Pat. No. 5,214,119 (Leir et al.), U.S. Pat. No. 5,461,134 (Leir et al.), and U.S. Pat. No. 5,512,650 (Leir et al.). One of the described methods involves combining under reaction conditions and under an inert atmosphere (a) an amine functional end blocker of the following formula

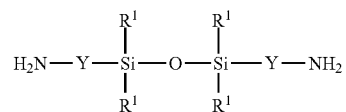

where Y and $R^1$ are the same as defined for Formulas (I) and (II); (b) sufficient cyclic siloxane to react with the amine functional end blocker to form a polydiorganosiloxane diamine having a molecular weight less than 2,000 grams per mole; and (c) an anhydrous aminoalkyl silanolate catalyst of the following formula

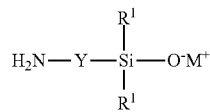

where Y and $R^1$ are the same as defined in Formulas (I) and (II) and $M^+$ is a sodium ion, potassium ion, cesium ion, rubidium ion, or tetramethylammonium ion. The reaction is continued until all or substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine functional end blocker to the cyclic siloxane can be used to vary the molecular weight of the resulting polydiorganosiloxane diamine of Formula (II).

Another method of preparing the polydiorganosiloxane diamine of Formula (II) includes combining under reaction conditions and under an inert atmosphere (a) an amine functional end blocker of the following formula

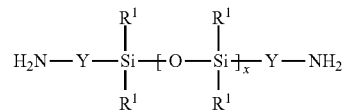

where $R^1$ and Y are the same as described for Formula (I) and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 (Sherman et al.). This procedure can be used to prepare any molecular weight of the polydiorganosiloxane diamine.

Yet another method of preparing the polydiorganosiloxane diamine of Formula (II) is described in U.S. Pat. No. 6,531, 620 (Brader et al.). In this method, a cyclic silazane is reacted with a siloxane material having hydroxy end groups as shown in the following reaction.

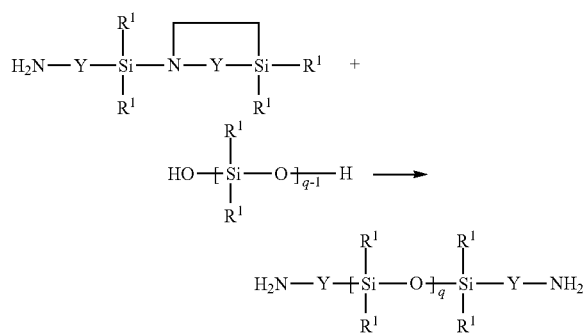

The groups $R^1$ and Y are same as described for Formula (II). The subscript q is an integer greater than or equal to 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

The molecular weight of the polydiorganosiloxane diamine component provides a means of adjusting the modulus of the resultant silicone polyurea block copolymer. In general, high molecular weight polydiorganosiloxane diamines provide copolymers of lower modulus whereas low molecular polydiorganosiloxane polyamines provide copolymers of higher modulus.

The polydiorganosiloxane diamine component of Formula (II) reacts with a polyisocyanate to form the silicone polyurea block copolymers. The group Z in Formula (I) is equal to the polyisocyanate minus the multiple isocyanate groups. Any polyisocyanate that can react with the above-described polydiorganosiloxane diamine can be used. The polyisocyanates are typically diisocyanates or triisocyanates. Examples of suitable diisocyanates include aromatic diisocyanates such as 2,6-toluene diisocyanate, 2,5-toluene diisocyanate, 2,4-toluene diisocyanate, m-phenylene diisocyanate, p-phenylene diisocyanate, methylenediphenylene-4,4'-diisocyanate, polycarbodiimide-modified methylenediphenylene diisocyanate, (4,4'-diisocyanato-3,3',5,5'-tetraethyl)diphenylmethane, 4,4-diisocyanato-3,3'-dimethoxybiphenyl(o-dianisidine diisocyanate), 5-chloro-2,4-toluene diisocyanate, 1-chloromethyl-2,4-diisocyanato benzene, m-xylylene diisocyanate and tetramethyl-m-xylylene diisocyanate; and aliphatic diisocyanates such as 1,4-diisocyanatobutane, 1,6-diisocyanatohexane, 1,12-diisocyanatododecane, and 2-methyl-1,5-diisocyanatopentane; and cycloaliphatic diisocyanates such as methylenedicyclohexylene-4,4'-diisocyanate, 3-isocyanatomethyl-3,5,5-trimethylcyclohexyl isocyanate (isophorone diisocyanate), and cyclohexylene-1,4-diisocyanate. Examples of suitable triisocyanates include those produced from biurets, isocyanurates, and adducts. Examples of commercially available polyisocyanates include portions of the series of polyisocyanates available under the trade designations DESMODUR and MONDUR from Bayer and PAPI from Dow Plastics (Midland, Mich.).

The reaction mixture used to prepare the silicone polyurea block copolymer of Formula (I) can include an optional organic polyamine. In no organic polyamine is used, the variable m in Formula (I) is equal to zero. If an organic polyamine is used, the variable m in Formula (I) has a value greater than zero. The term "polyamine" refers to a compound having at least two amino groups. The term "organic polyamine" refers to a polyamine that does not include a silicone group. The group B in Formula (I) is equal to the polyamine minus the multiple amine groups. Examples of useful organic polyamines include polyoxyalkylene diamines such as those commercially available under the trade designation D-230, D-400, D-2000, D-4000, ED-2001 and EDR-148 from Hunstman Corporation (Houston, Tex.), polyoxyalkylene triamines such as those commercially available under the trade designations T-403, T-3000 and T-5000 from Hunstman Corporation, alkylene diamines such as ethylene diamine, and various polyamines commercially available from INVISTA Specialty Intermediates (Wilmington, Del.) under the trade designation DYTEK (e.g., DYTEK A is 2-methylpentamethylenediamine and DYTEK EP is 1,3-pentanediamine).

The optional organic polyamine provides a further means of modifying the modulus of the copolymer. The concentration, type, and molecular weight of the organic polyamine can influence the modulus of the silicone polyurea block copolymer. Typically, the polyamine has a molecular weight no greater than about 300 grams per mole.

To prepare the silicone polyurea block copolymer of Formula (I), the polyisocyanate is typically added in a stoichiometric amount based on the amount of polydiorganosiloxane diamine and any optional organic polyamines included in the reaction mixture to prepare the siloxane polyurea block copolymers.

Another useful class of silicone elastomers is oxamide-based polymers such as polydiorganosiloxane polyoxamide block copolymers. Examples of polydiorganosiloxane polyoxamide block copolymers are described, for example, in US Patent Application Publication No. 2007/0148474 (Leir et al.). The polydiorganosiloxane polyoxamide block copolymer contains at least two repeat units of Formula (III).

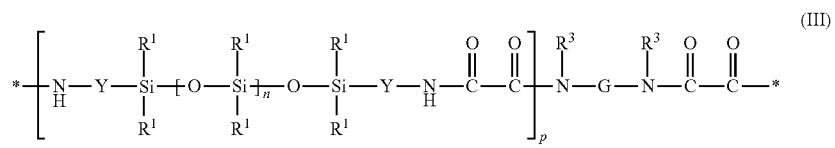

In Formula (III), $R^1$ and Y are the same as described above for Formula (I). That is, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Each asterisk (*) indicates a site of attachment of the repeat unit to another group in the copolymer such as, for example, another repeat unit of Formula (III).

Each subscript n in Formula (III) is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula (III) is a residual unit that is equal to a diamine compound of formula $R^3HN-G-NHR^3$ minus the two amino groups (i.e., $-NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine or the like). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N-G-NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula (II), which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a formula $-R^a-(CO)-NH-$ where $R^a$ is an alkylene. All of the carbonylamino groups along the backbone of the copolymeric material are part of an oxalylamino group (i.e., the $-(CO)-(CO)-NH-$ group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is usually a linear, block copolymer and is an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The polydiorganosiloxane polyoxamide copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers exhibit good to excellent mechanical strength.

Another useful class of silicone elastomers is amide-based silicone copolymers. Such polymers are similar to the urea-based polymers, containing amide linkages ($-N(D)-(CO)-$ with the carbonyl group bonded to an alkylene or arylene group) instead of urea linkages ($-N(D)-(CO)-NH-$), where $-(CO)-$ represents a carbonyl group and D is the same as defined above for Formula (I). The group D is often hydrogen or alkyl.

The amide-based copolymers may be prepared in a variety of different ways. Starting from the polydiorganosiloxane diamine described above in Formula (II), the amide-based copolymer can be prepared by reaction with a poly(carboxylic acid) or a poly(carboxylic acid) derivative such as, for example, esters of the poly(carboxylic acid). In some embodiments, an amide-based silicone elastomer is prepared by the reaction of a polydiorganosiloxane diamine and dimethyl salicylate of adipic acid.

An alternative reaction pathway to amide-based silicone elastomers utilizes a silicone di-carboxylic acid derivative such as a carboxylic acid ester. Silicone carboxylic acid esters can be prepared through the hydrosilation reaction of a silicone hydride (i.e. a silicone terminated with a silicon-hydride (Si—H) group) and an ethylenically unsaturated ester. For example a silicone di-hydride can be reacted with an ethylenically unsaturated ester such as, for example, $CH_2=CH-(CH_2)_v-(CO)-OR$, where $-(CO)-$ represents a carbonyl group and v is an integer up to 15, and R is an alkyl, aryl or substituted aryl group, to yield a silicone chain capped with $-Si-(CH_2)_{v+2}-(CO)-OR$. The $-(CO)-OR$ group is a carboxylic acid derivative which can be reacted with a silicone diamine, a polyamine or a combination thereof. Suitable silicone diamines and polyamines have been discussed above and include aliphatic, aromatic or oligomeric diamines (such as ethylene diamine, phenylene diamine, xylylene diamine, polyoxalkylene diamines, etc.).

Another useful class of silicone elastomers is urethane-based silicone polymers such as silicone polyurea-urethane block copolymers. Silicone polyurea-urethane block copolymers include the reaction product of a polydiorganosiloxane diamine (also referred to as silicone diamine), a diisocyanate, and an organic polyol. Such materials are structurally very similar to the structure of Formula (I) except that the —N(D)-B—N(D)- links are replaced by —O—B—O— links. Examples are such polymers are further described in U.S. Pat. No. 5,214,119 (Leir et al.).

These urethane-based silicone polymers are prepared in the same manner as the urea-based silicone polymers except that an organic polyol is substituted for an organic polyamine. Typically, since the reaction between an alcohol and an isocyanate is slower than the reaction between a amine and an isocyanate, a catalyst is used. The catalyst is often a tin-containing compound.

The silicone elastomers can be prepared by solvent-based processes, solventless processes or a combination thereof. Useful solvent-based processes are described, for example, in U.S. Pat. No. 5,214,119 (Leir et al.). Useful methods of manufacturing silicone elastomers are also described in U.S. Pat. No. 5,512,650 (Leir et al.), and U.S. Pat. No. 5,461,134 (Leir et al.), U.S. Pat. No. 6,664,359 (Kangas), U.S. Pat. No. 6,846,893 (Sherman et al.), and U.S. Pat. No. 6,407,195 (Sherman et al.); and US Patent Publication No. 2007/0148475 (Sherman et al.) and 2007/0148475 (Leir et al.).

The silicone material included in the silicone-based adhesive can include a silicone gum. The silicone gum is often a polydiorganosiloxane with the organo groups selected from alkyl, haloalkyl, aralkyl, alkenyl, aryl, or aryl substituted with an alkyl, alkoxy, or halo. Exemplary organo groups include, but are not limited to, methyl, ethyl, and phenyl. Often, at least 50 percent of the organo groups of the silicone gum are methyl groups. In some examples, the silicone gum is polydimethylsiloxane. Suitable silicone gums are commercially available from multiple suppliers including General Electric, Dow Corning, and Wacker Chemie.

Any of the silicone elastomers or silicone gums can be cured (crosslinked). Any suitable method of curing can be used. For example, the curing reaction can be a free-radical reaction in the presence of a peroxide, an addition reaction in the presence of a platinum-based catalyst or a rhodium-based catalyst, or a condensation reaction in the presence of a tin-based catalyst.

Suitable peroxides for curing silicone elastomers and/or gums include, but are not limited to, 2,4-dichloro benzoyl peroxide, benzoyl peroxide, lauroyl peroxide, decanoylperoxide, and dicumyl peroxide. The peroxide is typically added in an amount in the range of 0.1 to 4 weight percent, in the range of 0.5 to 4 weight percent, or in the range of 0.5 to 3 weight percent based on the total weight of solids in the adhesive composition. Any solvent that may be in the adhesive composition is typically removed prior to curing the silicone elastomer and/or gum. For example, the solvent can be removed at temperatures in the range of 60° C. to 90° C. and the curing reaction can occur at temperatures in the range of 130° C. to 200° C. The curing reaction involves the decomposition of the peroxide compound and the accompanying formation of free radicals. These free radicals can then attack the organo groups of a polydiorganosiloxane unit, extract protons, and generate additional free radicals. Crosslinks form when two free radicals of the same polydiorganosiloxane unit or of multiple polydiorganosilixane units combine.

Suitable catalysts for addition and/or condensation reactions often include, for example, organo-platinum compounds, organo-rhodium compounds, and organo-tin compounds. Exemplary catalysts are commercially available under the trade designation SYL-OFF 4000 and SYL-OFF 7044 from Dow Corning Corporation (Midland, Mich.) and under the trade designation SILOPREN U from Momentive (Albany, N.Y.). In some addition curing reactions with these catalysts, a first silicone compound having silicon hydride groups (e.g., a polydiorganosiloxane with terminal silicone hydride groups or polydiorganosiloxane unit with a terminal silicon hydride group) is reacted with a second silicone compound having vinyl groups (e.g., a polydiorganosiloxane with terminal vinyl groups or a polydiorganosiloxane unit with a terminal vinyl group). In some condensation curing reactions, compounds with silanol groups (e.g., a polydiorganosiloxane with terminal silanol groups or a polydiorganosiloxane unit with a terminal silanol group) are reacted together. In both the addition and condensation reactions, any solvent that is present can be removed from the adhesive composition during the curing process. These reactions often occur at temperatures in the range of 100° C. to 150° C.

Many exemplary pressure-sensitive adhesive compositions include a tackifying resin in addition to the silicone elastomer and/or gum. Any suitable tackifying resin can be used but a silicone tackifying resin (i.e., MQ tackifying resin) is often selected. The MQ tackifying resin and the silicone elastomer and/or gum generally are present in the form of a blend. The blend can include one or more MQ tackifying resins.

The MQ tackifying resins may be referred to as silicone resins, silicone tackifying resins, copolymeric silicone resins, or copolymeric silicone tackifying resins. Useful MQ tackifying resins include, for example, MQ silicone resins, MQD silicone resins, and MQT silicone resins. Blends of these silicone resins can be used. These tackifying resins often have a number average molecular weight of about 100 to about 50,000, or about 500 to about 20,000 and generally have methyl substituents. The MQ silicone resins include both non-functional and functional resins. Functional silicone resins have one or more functionalities including, for example, silicon-bonded hydrogen, silicon-bonded alkenyl, or silanol groups.

MQ silicone resins are copolymeric silicone resins having $R'_3SiO_{1/2}$ units (M units) and $SiO_{4/2}$ units (Q units). Such resins are described in, for example, Encyclopedia of Polymer Science and Engineering, vol. 15, John Wiley & Sons, New York, (1989), pp. 265 to 270, and U.S. Pat. No. 2,676,182 (Daudt at al.), U.S. Pat. No. 3,627,851 (Brady), U.S. Pat. No. 3,772,247 (Flannigan), and U.S. Pat. No. 5,248,739 (Schmidt et al.). MQ silicone resins having functional groups are described in U.S. Pat. No. 4,774,310 (Butler), which discloses silyl hydride groups, U.S. Pat. No. 5,262,558 (Kobayashi et al.), which discloses vinyl and trifluoropropyl groups, and U.S. Pat. No. 4,707,531 (Shirahata), which discloses silyl hydride and vinyl groups. The above-described resins are generally prepared in a solvent. Dried or solventless MQ silicone resins can be prepared as described in U.S. Pat. No. 5,319,040 (Wengrovius et al.), U.S. Pat. No. 5,302,685 (Tsumura), and U.S. Pat. No. 4,935,484 (Wolfgruber).

MQD silicone resins are terpolymers having $R'_3SiO_{1/2}$ units (M units), $SiO_{4/2}$ units (Q units), and $R'_2SiO_{2/2}$ units (D units) as described, e.g., in U.S. Pat. No. 5,110,890 (Butler).

MQT silicone resins are terpolymers having $R'_3SiO_{1/2}$ units (M units), $SiO_{4/2}$ units (Q units), and $R'SiO_{3/2}$ units (T units) (MQT resins).

The MQ silicone resins are often supplied in an organic solvent. Commercially available MQ silicone resins include SR-545 MQ resin in toluene available from General Electric Co., Silicone Resins Division (Waterford, N.Y.) and MQOH resins in toluene available from PCR, Inc. (Gainesville, Fla.). These organic solutions of MQ silicone resin may be used as provided from the supplier or may be dried by any number of techniques known in the art to provide a MQ silicone resin at 100 percent non-volatile content. Suitable drying methods include, but are not limited to, spray drying, oven drying, steam separation, and the like.

Typically the silicone elastomer and/or gum is present in the pressure-sensitive adhesive composition in an amount equal to at least 30 weight percent based on the weight of the pressure-sensitive adhesive or based on the solids content of the adhesive composition. The amount of the silicone elastomer and/or gum often ranges from 30 to 90 weight percent, from 30 to 85 weight percent, from 30 to 70 weight percent, from 40 to 80 weight percent, from 40 to 60 weight percent, or from 45 to 55 weight percent. The silicone tackifying resin (i.e., MQ tackifying resin), if present, is typically present in an amount equal to at least 10 weight percent based on the weight of the pressure-sensitive adhesive or based on the solid content of the adhesive composition. In some embodiments, the silicone tackifying resin is present in the pressure-sensitive adhesive composition in an amount ranging from 10 to 70 weight percent, from 20 to about 70 weight percent, from 30 to 70 weight percent, from 40 to 60 weight percent, or from 45 weight percent to 55 weight percent. Many pressure-sensitive adhesive layers contain 30 to 90 weight percent silicone elastomer and/or gum and 10 to 70 weight percent silicone tackifying resin, 40 to 80 weight percent silicone elastomer and/or gum and 20 to 60 weight percent silicone tackifying resin, 40 to 60 weight percent silicone elastomer and/or gum and 40 to 60 weight percent silicone tackifying resin. These amounts are based on the solids content of the pressure-sensitive adhesive composition.

The adhesive compositions may be prepared in a solvent-based process, a solventless process, or a combination thereof. If a solvent-based process is used to form the silicone elastomer, for example, the optional tackifying resin can be introduced before, during, or after the reactants used to form the silicone elastomer have been introduced into the reaction mixture. The polymerization reaction may be carried out in a single solvent or a mixture of solvents. The solvents are preferably not reactive with the components of the reaction mixture. The starting materials (i.e., reactants) and final products preferably remain completely miscible in the solvents during and after the completion of the polymerization reactions. Although these reactions can be conducted at room temperature or up to the boiling point of the solvent, the reactions are generally carried out at ambient temperature up to 50° C. In many solvent-based processes, the optional tackifying resin is added after the silicone elastomer has been formed.

In substantially solventless processes, the reactants used to form the silicone elastomer can be mixed with the optional tackifying resin in a reactor. That is, the polymerization reaction can occur in the presence of the tackifying resin. Alternatively, the silicone elastomer can be made in a solventless process and then combined with the tackifying resin. For example, silicone elastomer can be prepared and then combined in a mixer or extruder with the tackifying resin.

One useful method that includes a combination of a solvent-based process and a solventless process includes preparing the silicone elastomer using a solventless process and then mixing the silicone elastomer with the tackifying resin solution in a solvent.

Any suitable method can be used to prepare the adhesive layers. For example, the pressure-sensitive adhesive composition can be coated onto a support layer such as a release liner, coated directly onto the backing layer, or co-extruded with the backing layer. In some embodiments the adhesive layer is disposed between two release liners and then laminated to the backing layer. The same types of release liners described for use in the preparation of the backing layer can be used in the preparation of the adhesive layers.

If the silicone elastomer and/or gum is cured, the curing reaction often occurs after the adhesive layer has been formed. For example, the adhesive layer can be formed and then heated to drive off any solvent that may be present and to cure the silicone elastomer and/or gum. The solvent can often be driven off simultaneously with the curing reaction. If a peroxide is used for curing, however, the solvent is typically removed at a first temperature and then the temperature is increased for curing.

In some embodiments it may be desirable to impart a microstructured surface to one or both major surfaces of the adhesive layer. It may be desirable to have a microstructured surface on at least one surface of the adhesive to aid air egress during lamination. If it is desired to have a microstructured surface on one or both surfaces of the adhesive film, the adhesive coating or film may be placed on a tool or a liner containing microstructured features. The liner or tool can then be removed to expose an adhesive film having a microstructured surface. Generally with optical applications it is desirable that the microstructures disappear over time to prevent interference with optical properties.

Any suitable thickness can be used for the pressure-sensitive adhesive layer or layers. In many embodiments, each pressure-sensitive adhesive layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness of the pressure-sensitive adhesive layer is often at least 0.5 mils (12.5 micrometers) or at least 1 mil (25 micrometers). For example, the thickness of the pressure-sensitive adhesive layer can be in the range of 0.5 mils (2.5 micrometers) to 10 mils (250 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

In some embodiments, the adhesive tape has a single pressure-sensitive adhesive layer adhered directly or indirectly to the backing layer. In other embodiments, the adhesive tape has a first pressure-sensitive adhesive layer adhered directly or indirectly to a first major surface of the backing layer and a second pressure-sensitive adhesive layer adhered directly or indirectly to a second major surface of the backing layer. When there are two pressure-sensitive adhesive layers, the two layers can be the same or different. In some adhesive tapes with different adhesive layers, different silicone elastomers and/or gums or different amounts of the same silicone elastomer and/or gum are used in the two adhesive layers. In other adhesive tapes with different adhesive layers, different tackifier resins or different amounts of the tackifier resins are used in the two adhesive layers. In still other adhesive tapes with a different adhesive layers, the silicone elastomers and/or gums are crosslinked to different extent (e.g., one adhesive layer is cured while the other adhesive layer is not cured). Often, the compositions are selected so that the adhesive strength of the first pressure-sensitive adhesive layer is different than the adhesive strength of the second pressure-sensitive adhesive layer.

The adhesive tape, which contains a backing layer and at least one pressure-sensitive adhesive layer, can be formed in any suitable manner. In many embodiments, the backing layer is prepared separately from the pressure-sensitive adhesive layer. After preparation of the backing layer, at least one separately formed pressure-sensitive adhesive layer can be laminated to a major surface of the backing layer. Often a first pressure-sensitive adhesive layer is laminated to a first major surface of the backing layer and a second pressure-sensitive adhesive layer is laminated to a second major surface (i.e., opposite the first major surface) of the backing layer.

In other embodiments, the backing layer is formed and then the first pressure-sensitive adhesive layer is applied to at least one surface of the previously prepared backing layer. That is, the backing layer functions as the support for the deposition of the first pressure-sensitive adhesive layer. Any suitable deposition method can be used such as coating or extrusion. If the adhesive tape has two pressure-sensitive adhesive layers, the second pressure-sensitive adhesive layer can be positioned adjacent to the other major surface (i.e., second major surface) of the backing layer by lamination of a separately formed second pressure-sensitive adhesive layer. Alternatively, a second pressure-sensitive adhesive composition can be coated or extruded onto the other major surface of the backing layer. In this alternative embodiment, the first pressure-sensitive adhesive layer is often positioned adjacent to a first release liner.

In another example of making an adhesive tape with two adhesive layers, the backing layer can be cast between two adhesive layers that are disposed on release liners. That is, the first pressure-sensitive adhesive layer can be prepared on a first release liner, a second pressure-sensitive adhesive layer can be prepared on a second release liner, and the poly(alkylene) copolymer can be cast between the two adhesive layers. The hot poly(alkylene) copolymer extrudate can laminate to the first adhesive layer and to the second adhesive layer. No blocking agent or slip agent is needed. The resulting construction can have the following layers: first release liner-first adhesive layer-backing layer-second adhesive layer-second release liner.

In yet other methods, the backing layer and the pressure-sensitive adhesive layers (one or two depending on whether one or two adhesive layers are desired) can be extruded between two liners. Alternatively, the release liners can also be co-extruded. In most of these methods involving the use of two release liners, additives such as anti-blocking agents and slip agents are not needed. Any other method that can be envisioned to provide or maintain the optical clarity also can be used.

In another aspect, an article is provided. In a first embodiment, the article includes a first substrate and an adhesive tape that is adhered to the first substrate. The adhesive tape includes (A) a backing layer, (B) a first pressure-sensitive adhesive layer that is adjacent to a first major surface of the backing layer, and (C) a tab that extends beyond the first substrate. The adhesive tape is the same as described above. Pulling the tab stretches the adhesive tape and releases the adhesive tape from the first substrate. The adhesive tape is stretchable at least 50 percent in a first direction without breaking when the tab is pulled. In this embodiment of the article, the first pressure-sensitive adhesive layer is positioned between the first substrate and the backing layer with the pressure-sensitive adhesive layer being adhered directly or indirectly to both the first substrate and the backing layer.

In a second embodiment, the article includes a first substrate, a second substrate, and an adhesive tape positioned between the first substrate and the second substrate. The adhesive tape couples the first substrate to the second substrate. The adhesive tape includes a (A) a backing layer, (B) a first pressure-sensitive adhesive layer that is adjacent to a first major surface of the backing layer and a second pressure-sensitive adhesive layer that is adjacent to a second major surface of the backing layer, and (C) a tab that extends beyond at least one of the first substrate and the second substrate, wherein the tab is part of the backing layer or attached to the backing layer. The adhesive tape is the same as described above. Pulling the tab stretches the adhesive tape and releases the adhesive tape from the first substrate, from the second substrate, or from both the first substrate and the second substrate. The adhesive tape is stretchable at least 50 percent in a first direction without breaking when the tab is pulled. In this embodiment of the article, the first pressure-sensitive adhesive layer is positioned between the first substrate and the backing layer with the first pressure-sensitive adhesive layer being adhered directly or indirectly to both the first substrate and the backing layer. Additionally, the second pressure-sensitive adhesive layer is positioned between the second substrate and the backing layer with the second pressure-sensitive adhesive layer being adhered directly or indirectly to both the second substrate and the backing layer.

The coupling step of two substrates with the adhesive tape can include providing the adhesive tape in a form that includes release liners adjacent to each adhesive layer. That is, the adhesive tape can be provided as a construction of layers arranged in the following order: first release liner-first adhesive layer-backing layer-second adhesive layer-second release liner. The first release liner can be removed to expose the first adhesive layer. The exposed first adhesive layer can then be positioned adjacent to the first substrate and adhered directly or indirectly to the first substrate. The second release liner can then be removed to expose the second adhesive layer. The exposed second adhesive layer can then be positioned adjacent to the second substrate and adhered directly or indirectly to the second substrate. Often different release liners are used such that one is removed more readily than the other.

Any suitable substrates can be adhered to each pressure-sensitive adhesive layer. The substrates can provide any desired function, can be formed from any suitable material, and can have any desired flexibility, size, shape, thickness, or aspect ratio. The substrate can be a single layer or can include multiple layers of material such as a support layer, a primer layer, a hard coat layer (e.g., acrylic or polyurethane), a decorative design, or the like. Either substrate or both substrates can be an outer surface layer of another article. Either substrate or both substrates can contain any suitable material such as a polymeric material, glass material, ceramic material, metal-containing material (e.g., metal, metal oxide, metal alloy, or organometallic compound), or a combination thereof.

Exemplary metal, metal oxide, or metal alloy for use in a substrate can contain indium tin oxide, titanium, nickel, steel, aluminum, copper, zinc, iron, cobalt, silver, gold, platinum, lead, and the like. Exemplary polymeric materials for use in the substrate include polycarbonates, polyesters (e.g., polyethylene terephthalates and polyethylene naphthalates), polyurethanes, poly(meth)acrylates (e.g., polymethyl methacrylates), polyvinyl alcohols, polyvinyl chloride, polyolefins such as polyethylenes, polypropylenes, or poly(cyclic olefins) such as polynorbornene, polyvinyl chlorides, polyimides, cellulose triacetates, acrylonitrile-butadiene-styrene copolymers, epoxies, nylons, and the like.

In some embodiments of the article, an optically clear adhesive tape can be positioned between a first substrate and a second substrate such that the second substrate can be seen by viewing through both the first substrate and the second substrate. That is, the region of the adhesive tape that is positioned between the two substrates is optically clear. The second substrate preferably can be viewed without distortion through both the first substrate and the stretch releasable adhesive tape. The second substrate and the first substrate can be, for example, optically coupled. As used herein, the term "optically coupled" means that the any air gap between the first substrate and the second substrate has been eliminated. An air gap can lead to mismatching of refractive indexes between substrates. The optical coupling of the substrates often leads to enhanced brightness and enhanced contrast. Further, the coupling of the substrates can provide increased structural support.

Each substrate can have a variety of functions such as, for example, providing flexibility, rigidity, strength or support, conductivity or insulation, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing. The resulting articles can be an optical element or can be used to prepare an optical element. As used herein, the term "optical element" refers to an article or component that has an optical effect or optical application. The optical element can be used, for example, in electronic displays projection devices or applications, photonics devices or applications, and graphic devices or applications.

In some of these devices or applications, at least one of the first substrate and second substrate is selected from an outer layer of a display (e.g., electronic display), polarizer, touch panel, lens, reflector, diffraction grating, mirror, projection prism, or multilayer optical film. Exemplary substrates include, but are not limited to, the outer layer of liquid crystal displays, electrowetting displays, plasma displays, cathode ray tubes, or touch sensors.

More particularly, an article is provided that includes a first substrate, a second substrate, and a stretch releasable adhesive tape positioned between the first substrate and the second substrate. At least one of the first substrate and second substrate is selected from a display, polarizer, touch panel, lens, reflector, diffraction grating, mirror, projection prism, or multilayer optical film. The stretch releasable adhesive tape is optically clear and couples the first substrate to the second substrate. The second substrate is visible when viewed through both the first substrate and the adhesive tape. The stretch releasable adhesive tape includes (A) a backing layer that contains a poly(alkylene) copolymer, (B) a first pressure-sensitive adhesive layer that is adjacent to a first major surface of the backing layer and a second pressure-sensitive adhesive layer that is adjacent to a second major surface of the backing layer, wherein each pressure-sensitive adhesive layer includes a silicone-based adhesive composition, and (C) a tab that extends beyond at least one of the first substrate and the second substrate. The adhesive tape can be stretched at least 50 percent in a first direction without breaking. For example, the length of the adhesive tape can be increased at least 50 percent without breaking.

In some applications, the first substrate is a protective layer that is coupled to a second substrate that is part of an information display device. The protective layer can be a protective film, a layer of glass, a layer of polycarbonate, or the like. The protective layer can function, for example, as a cover lens for the information display device. Examples of information display devices include devices with a wide range of display area configurations including liquid crystal displays, plasma displays, front and rear projection displays, cathode ray tubes, and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, or signage such as graphic displays. In some applications, the bonding of a rigid cover to the display screen with the elimination of any air gap between them can improve the quality of the displayed image.

In some specific applications, the optically clear, stretch releasable adhesive tape can couple an information display device and a cover lens prepared of glass or polycarbonate. That is, the article can have the following construction: cover lens-optically clear, stretch releasable adhesive tape-information display device. More specifically, the article can be arranged in the following order: cover lens-first optically clear adhesive layer-backing layer-second optically clear adhesive layer-information display device. The information display device can be viewed by looking through both the cover lens and the optically clear, stretch releasable adhesive tape. For example, the first substrate can be a cover lens and the second substrate can be a liquid crystal display. The outer surface of the liquid crystal display is often a polarizer. In other example, the first substrate can be a cover lens and the second substrate can be an electrowetting display with an outer surface that is predominately glass.

The optically clear adhesive tape can be used to couple together more than two substrates. That is, the articles can include more than two substrates and more than one optically clear adhesive tape. For example, the article could be arranged in the following order: first substrate-first optically clear, stretch releasable adhesive tape-second substrate-second optically clear, stretch releasable adhesive tape-third substrate. More specifically, the article would be arranged in the following order: first substrate-first optically clear adhesive layer-first backing layer-second optically clear adhesive layer-second substrate-third optically clear adhesive layer-second backing layer-fourth optically clear adhesive layer-third substrate. The third substrate can be viewed by looking through the first substrate, the first optically clear adhesive layer, the second substrate, and the second optically clear adhesive layer. For example, the first substrate can be a cover lens, the second substrate can be a touch panel, and the third substrate can be an information display device such as a liquid crystal display. Touch panels often have an outer surface of glass, polyester, or indium tin oxide.

Alternatively, the optically clear, stretch releasable adhesive tapes can be used to couple two substrates together and another optically clear adhesive can be used to join additional substrates. For example, the article could be arranged in the following order—first substrate-optically clear adhesive-second substrate-optically clear, stretch releasable adhesive tape-third substrate. As a specific example, the first substrate can be a cover lens, the second substrate can be a touch panel, and the third substrate can be an information display device such as a liquid crystal display. This embodiment uses the stretch releasable adhesive tape only to couple the information display device to the rest of the article. Less expensive components can be coupled using an adhesive that is not stretch releasable.

In other applications, at least one of the substrates is an optical film. Any suitable optical film can be used in the articles. As used herein, the term "optical film" refers to a film that can be used to produce an optical effect. The optical films are typically polymer-containing films that can be a single layer or multiple layers. Some optical films have alternating layers of polymeric material with different indexes of refraction. Other optical films have alternating polymeric layers and metal-containing layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, infrared, or radio frequency regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films. Exemplary optical films are further described in the following patents: U.S. Pat. No. 6,049,419 (Wheatley et al.), U.S. Pat. No. 5,882,774 (Jonza et al.), U.S. Pat. No. 6,049,419 (Wheatley et al.), U.S. Pat. No. RE 34,605 (Schrenk et al.), U.S. Pat. No. 5,579,162 (Bjornard et al.), and U.S. Pat. No. 5,360,659 (Arends et al.).

The articles that include the two substrates coupled with the stretch releasable adhesive tape can be durable. As used herein, the term "durable" means that the articles can be subjected to elevated temperature (e.g., at least 50° C., at least 60° C., at least 70° C., at least 80° C., or at least 85° C.) and humidity conditions (e.g., at least 70 percent relative humidity, at least 75 percent relative humidity, at least 80 percent relative humidity, at least 85 percent relative humidity, or at least 90 percent relative humidity) without delamination. The elevated temperature and relative humidity conditions can be maintained for at least 1 day, at least 2 days, at least 3 days, at least 4 days, at least 5 days, at least 6 days, or at least 7 days. For example, the articles can be subjected to conditions such as 60° C. and 90 percent relative humidity or 85° C. and 85 percent relative humidity for 1 week without delamination. In many embodiments where the adhesive tape is optically clear, the adhesive tape remains optically clear even after exposure to the elevated temperature and humidity conditions. For example, the haze can remain no greater than 5 and the luminous transmittance can be at least 90 percent. Preferably no bubbles form in the article and no optical distortions result from being subjected to the elevated temperature and humidity conditions.

Stated differently, the pressure-sensitive adhesive layers can typically be removed (debonded) leaving little or no residue. After removal of the adhesive layer, the substrate is free or substantially free of the adhesive. For example, the adhesive layer can be adhered to a glass substrate for extended periods such as at least 1 week or at least 4 weeks and then be removed such that the glass substrate is free (i.e., no adhesive residue) or substantially free (i.e., almost no adhesive residue) of the adhesive.

Additionally, the adhesive tapes or pressure-sensitive adhesive layers preferably do not become yellow when exposed to the elevated temperature and humidity conditions. That is, the adhesive tapes can have resistance of ultraviolet radiation for extended periods of time. Still further, the adhesive tapes can be used under conditions where there is exposure to moisture. The adhesives can often be used in both indoor and outdoor applications.

The dual sided adhesive tape can be adhered to two substrates (i.e., the adhesive tape can be positioned between the two substrates) and then released from one or both substrates by stretching the backing layer and the adhesive layers of the adhesive tape. After being released, adhesive tape can be removed from between the two substrates and the substrates can be separated from each other. The adhesive tape can be constructed so that the first pressure-sensitive adhesive layer can be released from the first substrate prior to completely releasing the second pressure-sensitive adhesive from the second substrate. That is, the adhesive tape can be constructed to provide controlled sequential release from the first substrate and from the second substrate. This can often be accomplished by variation in the composition of the first pressure-sensitive adhesive and the second pressure-sensitive adhesive layers. Alternatively, this can be accomplished by having non-adhesive zones in one of the pressure-sensitive adhesive layers as described in U.S. Pat. No. 6,001,471 (Bries et al.).

The adhesive tape can be released by stretching in the event that the coupling of the two substrates is defective. Defects during fabrication can result from misalignment of the two substrates, entrapment of bubbles between the two substrates, or formation of patterns or creases. Alternatively, the substrates can be separated to allow at least one of the substrates to be used again. Typically, the stretch releasing adhesive tape can be cleanly removed from between the substrates with little or no visible adhesive residue remaining on either substrate. Additionally, the stretch releasing adhesive tape usually can be removed without damaging the appearance, function, or performance of either substrate. Even though the adhesive tape can be removed easily by stretching, the adhesive tape can provide high load shear adhesion prior to being stretched.

Also, over the lifetime of the device, if it is desirable to remove one of the substrates for replacement or recycling, the two substrates can be separated by stretch releasing the adhesive tape between the substrates. The substrates can be separated without damage to either substrate. This is an advantage over many other separation methods that typically introduce levels of stress than can damage one or both of the substrates. Such separation can be very difficult with many known pressure-sensitive adhesives.

In some applications it may be desirable to use a winding tool to aid the stretch release process and facilitate removal of the adhesive tape from between the two substrates. Such a winding tool can be as simple as a cylinder to which the tab of the adhesive tape is attached. The winding tool can be rotated to permit winding of the adhesive tape as it is stretched. Such a process could be mechanized using a powered roller of sufficient width so that the entire width of the tab can be simultaneously and smoothly pulled to release the adhesive tape from the substrates by zero degree peel. The stress and the rate of strain applied to the adhesive tape by the mechanized device could be controlled to release and remove the adhesive tape without tearing the backing layer and without leaving any adhesive residue on the substrates. The mechanized approach would be particularly advantageous for the decoupling of large substrates such as large format electronic displays or graphics. Vacuum manipulation devices could be used to lift and support the substrates during the decoupling step. By securing the substrates with vacuum manipulation tools, the substrates could be secured without introducing additional compressive force on the adhesive tape that could inhibit or prevent the release and removal of the adhesive tape from between the two substrates. Also, the vacuum manipulation tools could be used to collect the substrates without damage after removal of the adhesive tape.

EXAMPLES

These examples are for illustrative purposes only and are not meant to be limiting on the scope of the appended claims.

All parts, percentages, and ratios in the examples and the rest of the specification are based on weight, unless noted otherwise. Solvents and other reagents used were obtained from Sigma-Aldrich Chemical Company (Milwaukee, Wis.) unless otherwise noted.

Glossary

EXACT 5181 is a trade designation of ExxonMobil Chemical (Houston, Tex.) and refers to an ethylene-octene copolymer that is produced with a metallocene catalyst. This copolymer has a density of 0.882 grams per cubic centimeter.

EXACT 8210 is a trade designation of ExxonMobil Chemical (Houston, Tex.) and refers to an ethylene-octene copolymer that is produced with a metallocene catalyst. This copolymer has a density of 0.882 grams per cubic centimeter.

EXACT 3040 is a trade designation of ExxonMobil Chemical (Houston, Tex.) and refers to an ethylene-hexene copolymer that is produced with a metallocene catalyst. This copolymer has a density of 0.900 grams per cubic centimeter.

INFUSE D9530.05 is a trade designation of Dow Chemical Co. (Freeport, Tex.) and refers to an ethylene-octene block copolymer. This copolymer has a density of 0.877 grams per cubic centimeter.

VISTAMAXX 6102 is a trade designation of Exxon Mobil Chemical (Houston, Tex.) and refers to a polymeric material prepared from ethene, propene, and another alpha-alkene in the presence of a metallocene catalyst. This copolymer has a density of 0.862 grams per cubic centimeter.

PET refers to a polyethylene terephthalate film that is 2 mils (1 mil is equal to 0.001 inch) thick and that is commercially available under the trade designation SCOTCHPAR from 3M (St. Paul, Minn.).

SPU elastomer refers to a silicone polyurea block copolymer. The preparation is described below.

SPOx elastomer refers to a poly(dimethylsiloxane-oxamide) linear copolymer. The preparation is describe below.

DYTEK A is a trade designation for 2-methylpentamethylenediamine that is commercially available from INVISTA Specialty Intermediates (Wilmington, Del.).

H12MDI refers to methylenedicylcohexylene-4,4'-diisocyanate that is commercially available from Bayer (Pittsburgh, Pa.) under the trade designation DESMODUR W.

PDMS Diamine refers to a am-bis(aminopropyl)polydimethylsiloxane diamine prepared using the process of Example 2 in U.S. Pat. No. 5,461,134. The weight average molecular weight was approximately 35,000 grams per mole.

SR-545 refers to a MQ silicone resin in toluene (60 weight percent solids) that is commercially available from GE Silicones (Waterford, N.Y.).

DC Q2-7066 refers to a MQ silicone resin in xylene (62.7 weight percent solids) that is commercially available from Dow Corning Corporation (Midland, Mich.).

DC Q2-7735 refers to a pressure-sensitive adhesive (56 weight percent solids) that is commercially available from Dow Corning Corporation (Midland, Mich.). This adhesive contains a polydimethylsiloxane gum and resin dispersion.

DOW CORNING 7657 Adhesive is a polydimethyl siloxane gum (silicone gum) and resin (tackifier) mixture dispersed in xylene that is commercially available from Dow Corning Corporation (Midland, Mich.).

SYL-OFF 4000 Catalyst refers to a reactive organo-platinum complex dispersed in a polysiloxane that is commercially available from Dow Corning Corporation (Midland, Mich.).

SID 3352.0 refers to a paste consisting of 50 weight percent dichlorobenzoyl peroxide and 50 weight percent silicone fluid that is commercially available from Gelest (Morrisville, Pa.)

LOPAREX 5100 is the trade designation for a release liner that is commercially available from Loparex (Willowbrook, Ill.). The release liner is a PET film with a fluorosilicone coating.

Test Methods

Zero Degree Peel Force (Stretch Release Force)

Adhesive tape samples (adhesive on both sides of backing layer) were placed between two glass microscope slide substrates (3 inch by 1 inch) leaving an adhesive-free tab protruding from one end of the resulting assembly. The assembly was rolled twice with a 4.5 kilogram roller to firmly bond the adhesive tape to the two substrates. Adhesives were allowed to dwell on the substrates for at least 15 minutes or longer. The assembly was mounted in a tensile testing machine (INSTRON Model 4501 from Instron Co., Canton, Mass.) so that the substrates were gripped in the lower (fixed) jaws and the adhesive-free tab was clamped in the upper (crosshead) jaws. The tab was pulled at zero degrees relative to the adhered surfaces of the substrates and stretched to release (decouple) the substrates. The crosshead speed was recorded. The average stress required to effect release by stretching was recorded.

Haze and Luminous Transmittance

Haze and Luminous Transmittance was determined using a Gardner BYK Color TCS Plus model 8870 spectrophotometer from BYK Gardner, (Columbia, Md.) as described in ASTM Method 1003-07. CIE Standard Illuminant A was used. To prepare the samples for haze and luminous transmittance measurements, one release liner was removed from the adhesive layer and the adhesive layer was hand laminated to a 1 mil thick polyester film that is commercially available from DuPont (Wilmington, Del.) under the trade designation MELINEX. Care was taken to avoid trapped air bubbles between adhesive layer and polyester film. A 75×50 mm microscope glass slide (Plain Micro Slide, Dow Corning) was cleaned three times with isopropanol and dried with TEXWIPE 309 (Texwipe Company, N.Y.). The second release liner was removed from the adhesive layer and the exposed surface of the adhesive layer was then laminated to the glass slide using a hand roller. The sample was inspected to ensure that no dust or air bubbles were trapped in the laminated test specimen. The thickness of the test samples, percent haze and percent luminous transmittance were recorded.

Backing Layer

Backing Layer 1: EXACT 5181

A film of poly(alkylene) copolymer (EXACT 5181) was prepared in a 0.75 inch Brabender laboratory extruder with a mixing screw. After melting and mixing, the extrudate was forced through a 6 inch flat cast extrusion die to form a molten film. The temperatures within the extruder were 160° C. (zone 1), 180° C. (zone 2), 190° C. (zone 3), 190° C. (adapter), and 190° C. (die) respectively. The molten film was then laminated on each side with a 2 mil untreated PET film. The resulting laminate (PET/molten polymer/PET) was passed through a chilled roll stack to cool the poly(alkylene) copolymer into a solidified film. The line speed was adjusted to produce a solidified film with a caliper of approximately 4 mils (100 microns).

Backing Layer 2: EXACT 8210

A film of poly(alkylene) copolymer (EXACT 8210) was prepared in a 0.75 inch Brabender laboratory extruder with a mixing screw. After melting and mixing, the extrudate was forced through a 6 inch flat cast extrusion die to form a molten film. The temperatures within the extruder were 160° C. (zone 1), 180° C. (zone 2), 190° C. (zone 3), 190° C. (adapter), and 190° C. (die) respectively. The molten film was then laminated on each side with a 2 mil untreated PET film. The resulting laminate (PET/molten polymer/PET) was passed through a chilled roll stack to cool the poly(alkylene) copolymer into a solidified film. The line speed was adjusted to produce a solidified film with a caliper of approximately 4 mils (100 microns).

Backing Layer 3: EXACT 3040

A film of poly(alkylene) copolymer (EXACT 3040) was prepared in a 0.75 inch Brabender laboratory extruder with a mixing screw. After melting and mixing, the extrudate was forced through a 6 inch flat cast extrusion die to form a molten film. The temperatures within the extruder were 160° C. (zone 1), 180° C. (zone 2), 190° C. (zone 3), 190° C. (adapter), and 190° C. (die) respectively. The molten film was then laminated on each side with a 2 mil untreated PET film. The resulting laminate (PET/molten polymer/PET) was passed through a chilled roll stack to cool and solidify the poly (alkylene) copolymer into a solidified film. The line speed was adjusted to produce a solidified film with a caliper of approximately 4 mils (100 microns).

Backing Layer 4: INFUSE D9530.05

A film of poly(alkylene) copolymer (INFUSE D9530.05) was prepared in a 0.75 inch Brabender laboratory extruder with a mixing screw. After melting and mixing, the extrudate was forced through a 6 inch flat cast extrusion die to form a molten film. The temperatures within the extruder were 160° C. (zone 1), 180° C. (zone 2), 190° C. (zone 3), 190° C. (adapter), and 190° C. (die) respectively. The molten film was then laminated on each side with a 2 mil untreated PET film. The resulting laminate (PET/molten polymer/PET) was passed through a chilled roll stack to cool the poly(alkylene) copolymer into a solidified film. The line speed was adjusted to produce a solidified film with a caliper of approximately 4 mils (100 microns).

Backing Layer 5: VISTAMAXX 6102

A film of poly(alkylene) copolymer (VISTAMAXX 6102) was prepared in a 0.75 inch Brabender laboratory extruder with a mixing screw. After melting and mixing, the extrudate was forced through a 6 inch flat cast extrusion die to form a molten film. The temperatures within the extruder were 160° C. (zone 1), 180° C. (zone 2), 190° C. (zone 3), 190° C. (adapter), and 190° C. (die) respectively. The molten film was then laminated on each side with a 2 mil untreated PET film. The resulting laminate (PET/molten polymer/PET) was passed through a chilled roll stack to cool and solidify the poly(alkylene) copolymer into a solidified film. The line speed was adjusted to produce a solidified film with a caliper of approximately 4 mils (100 microns).

Adhesive Layers

Adhesive Layer 1

A SPU elastomer (silicone polyurea block copolymer) was made by mixing (1) α,ω-bis(aminopropyl)polydimethylsiloxane diamines with an approximate weight average molecular weight of 35,000 grams/mole, (2) 2-methylpentamethylenediamine (DYTEK A), and (3) H12MDI in a weight ratio of 1/0.5/1.5 with a toluene/isopropanol mixture (70/30 by weight) and allowing the polymer to fully chain-extend. The final solid content of this elastomer mixture was 20 weight percent.

This elastomer was further compounded with a 60 weight percent solution of MQ tackifier resin in toluene (SR-545) to prepare a 30 weight percent solids mixture of the SPU elastomer/MQ tackfier resin. The weight ratio of the elastomer to MQ resin was 50/50 on a solids basis.

After thorough mixing, the adhesive composition was coated on a release liner (LOPAREX 5100) and oven dried in a 70° C. oven for 15 minutes to yield a dry coating of the SPU pressure-sensitive adhesive. The dry adhesive thickness was about 1.5 micrometers. After conditioning for about 24 hours in a constant temperature and humidity room (23° C., 50 percent relative humidity), the pressure-sensitive adhesive layer was ready for lamination to the backing layer.

Adhesive Layer 2

This adhesive composition was prepared following the same procedure used for Adhesive Composition 1 above, with the exception that the weight ratio of SPU elastomer to MQ tackifier resin was adjusted to 45/55 on a solids basis. The adhesive layer was prepared following the same procedure described for Adhesive Layer 1.

Adhesive Layer 3

This adhesive composition was prepared using a polydimethylsiloxane gum and resin dispersion that is commercially available under the trade designation Q2-7735 (or DC Q2-7735) from Dow Corning (Midland, Mich.). DC Q2-7735, as received, had 56 weight percent solids in xylene. This mixture was further diluted with toluene to obtain a final solid content of 30 weight percent. The adhesive layer was prepared following the same procedure described for Adhesive Layer 1.

Adhesive Layer 4

A silicone polyoxamide (SPOx) elastomer was prepared in two steps. In the first step, an α,ω-bis(aminopropyl)polydimethylsiloxane diamine with a molecular weight of 25,000 grams/mole was capped with diethyloxalate to provide a α,ω-oxamido oxalate ester capped precursor. This step was completed by following the general procedure of Preparative Example 1 in U.S. Pat. No. 7,371,464. The diethyloxalate is used in a molar excess to the diamine to provide the α,ω-oxamido oxalate ester capped precursor. This precursor was chain-extended into the silicone polyoxamide elastomer using ethylenediamine following general procedure of Example 3 in U.S. Pat. No. 7,371,464 with the exception that only the precursor prepared above was used instead a mixture of precursors and the reaction time was four days. The mole ratio of precursor to ethylenediamine was 1 to 1. The material was used neat without determining the hardness.

A pressure-sensitive adhesive composition was prepared by combining 2546 grams DC Q2-7066 MQ resin (62.7 weight percent solids in toluene), 7300 grams toluene, and 1306 grams of the silicone polyoxamide elastomer. The silicone polyoxamide elastomer and MQ resin were mixed on a roller mill until the silicone polyoxamide elastomer was dissolved (overnight). This adhesive contained 45 weight percent silicone polyoxamide elastomer and 55 weight percent MQ resin with the final percent solids of the mixture being 26 weight percent. The adhesive layer was prepared following the same procedure described for Adhesive Layer 1.

Adhesive Layer 5

This adhesive composition was prepared following the same procedure used for Adhesive Composition 1 above, with the exception that SPU elastomer was blended with a different MQ tackifier resin (DC Q2-7066). The weight ratio of elastomer to MQ tackifier resin was 45/55 on a solids basis.

Adhesive Layer 6

This adhesive composition was prepared using commercially available adhesive (DOW CORNING 7657). The DOW CORNING 7657 adhesive, as received, had 56.5 weight percent solids in xylene. The DOW CORNING 7657 adhesive (100 grams) was diluted to 30 weight percent solids with toluene (88.3 grams) and then mixed with 0.4 parts per hundred of a catalyst (SYL-OFF 4000 Catalyst, 0.04 grams).

After thorough mixing, the adhesive composition was coated on a release liner (LOPAREX 5100) and oven dried in a 100° C. oven for 15 minutes. The dry adhesive thickness was about 1.5 micrometers. After conditioning for about 24 hours in a constant temperature and humidity room (23° C., 50 percent relative humidity), the pressure-sensitive adhesive layer was ready for lamination to the backing layer.

Adhesive Layer 7

This adhesive composition was prepared using a commercially available adhesive (Q2-7735 or DC Q2-7735) from Dow Corning (Midland, Mich.). Q2-7735, as received, had 56 weight percent solids in xylene.

A peroxide solution was prepared by adding 3.0 grams of peroxide paste (SID 3352.0 from Gelest), 7.2 grams of toluene, and 1.8 grams of MEK. The paste contained 50 weight percent dichlorobenzoyl peroxide and 50 weight percent silicone fluid. The resulting peroxide solution had 25 weight percent solids with a 80:20 weight ratio of toluene to MEK. A mixture containing 100 grams of Q2-7735 silicone pressure-sensitive adhesive (56 weight percent solids), 86 grams of toluene, and 2.24 grams of the peroxide solution was prepared. This yielded an adhesive composition containing 0.5 weight percent (based on adhesive solids) of active dichlorobenzoyl peroxide at a final solids content of 30 weight percent.

After thorough mixing, the adhesive composition was coated on a release liner (LOPAREX 5100) and oven dried in a 140° C. oven for 10 minutes. The dry adhesive thickness was about 1.5 micrometers. After conditioning for about 24 hours in a constant temperature and humidity room (23° C., 50 percent relative humidity), the pressure-sensitive adhesive layer was ready for lamination to the backing layer.

Adhesive Layer 8

A pressure-sensitive adhesive composition was prepared by combining 398.7 grams MQ resin (DC Q2-7066 with 62.7% solids in toluene), 1350.3 grams toluene, and 250 grams of the silicone polyoxamide elastomer (prepared as described for Adhesive Layer 4). The silicone polyoxamide elastomer, MQ resin, and toluene were mixed on a roller mill until the silicone polyoxamide elastomer was dissolved (overnight). This adhesive contained 50 weight percent silicone polyoxamide elastomer and 50 weight percent MQ resin with the final percent solids of the mixture being 25 weight percent.

A peroxide solution was made by adding 4.0 grams of peroxide paste (SID 3352.0 from Gelest), 9.6 grams of toluene, and 2.4 grams of MEK. The paste contained 50 weight percent dichlorobenzoyl peroxide and 50 weight percent silicone fluid. The resulting peroxide solution was 25 weight percent solids with a 80:20 weight ratio of toluene to MEK. The peroxide solution was added to the adhesive and thoroughly mixed. This yielded an adhesive composition containing 0.4 weight percent (based on adhesive solids) of active dichlorobenzoyl peroxide at a final solids content of 25 weight percent.

The adhesive layer was prepared following the same procedure described for Adhesive Layer 7.

Adhesive Layer 9

A pressure-sensitive adhesive composition was prepared by combining 398.7 grams MQ resin (DC Q2-7066 with 62.7% solids in toluene), 1350.3 grams toluene, and 250 grams of the silicone polyoxamide elastomer (prepared as described for Adhesive Layer 4). The silicone polyoxamide elastomer, MQ resin, and toluene were mixed on a roller mill until the silicone polyoxamide elastomer was dissolved (overnight). This adhesive contained 50 weight percent silicone polyoxamide elastomer and 50 weight percent MQ resin with the final percent solids of the mixture being 25 weight percent.

A peroxide solution was made by adding 6.5 grams of peroxide paste (SID 3352.0 from Gelest), 15.6 grams of toluene, and 3.9 grams of MEK. The paste contained 50 weight percent dichlorobenzoyl peroxide and 50 weight percent silicone fluid. The resulting peroxide solution was 25 weight percent solids with a 80:20 weight ratio of toluene to MEK. The peroxide solution was added to the adhesive and thoroughly mixed. This yielded an adhesive composition containing 0.65 weight percent (based on adhesive solids) of active dichlorobenzoyl peroxide at a final solids content of 25 weight percent.

The adhesive layer was prepared following the same procedure described for Adhesive Layer 7.

Example 1

Two samples of Adhesive Layer 1 (50 weight percent SPU and 50 weight percent SR-545) were laminated onto Backing Layer 3 prepared from EXACT 3040. Lamination was carried out at room temperature by positioning the adhesive layer between the backing layer and the release liner and rolling the assembly using a 4.5 pound rubber covered roller. The resulting optically clear adhesive tape (Adhesive Layer 1-Backing Layer 3-Adhesive Layer 1) was characterized as shown in Table 1.

Example 2

Two samples of Adhesive Layer 1 (50 weight percent SPU and 50 weight percent SR-545) were laminated onto Backing Layer 2 prepared from EXACT 8210. Lamination was carried out at room temperature by positioning the adhesive layer between the backing layer and the release liner and rolling the assembly using a 4.5 pound rubber covered roller. The resulting optically clear adhesive tape (Adhesive Layer 1-Backing Layer 2-Adhesive Layer 1) was characterized as shown in Table 1.

Example 3

Two samples of Adhesive Layer 1 (50 weight percent SPU and 50 weight percent SR-545) were laminated onto Backing Layer 1 prepared from EXACT 5181. Lamination was carried out at room temperature by positioning the adhesive layer between the backing layer and the release liner and rolling the assembly using a 4.5 pound rubber covered roller. The resulting optically clear adhesive tape (Adhesive Layer 1-Backing Layer 1-Adhesive Layer 1) was characterized as shown in Table 1.

Example 4

Two samples of Adhesive Layer 2 (45 weight percent SPU and 55 weight percent SR-545) were laminated onto Backing Layer 1 prepared from EXACT 5181. Lamination was carried out at room temperature by positioning the adhesive layer between the backing layer and the release liner and rolling the assembly using a 4.5 pound rubber covered roller. The resulting optically clear adhesive tape (Adhesive Layer 2-Backing Layer 1-Adhesive Layer 2) was characterized as shown in Table 1.

Example 5

Two samples of Adhesive Layer 3 (DC Q2-7735) were laminated onto Backing Layer 2 prepared from EXACT 8210. Lamination was carried out at room temperature by positioning the adhesive layer between the backing layer and the release liner and rolling the assembly using a 4.5 pound rubber covered roller. The resulting optically clear adhesive tape (Adhesive Layer 3-Backing Layer 2-Adhesive Layer 3) was characterized as shown in Table 1.

Example 6

Two samples of Adhesive Layer 4 (45 weight percent SPOx and 55 weight percent DC 2-7066) were laminated onto Backing Layer 2 prepared from EXACT 8210. Lamination was carried out at room temperature by positioning the adhesive layer between the backing layer and the release liner and rolling the assembly using a 4.5 pound rubber covered roller. The resulting optically clear adhesive tape (Adhesive Layer 4-Backing Layer 2-Adhesive Layer 4) was characterized as shown in Table 1.

Example 7

Two samples of Adhesive Layer 5 (45 weight percent SPU and 55 weight percent DC 2-7066) were laminated onto Backing Layer 4 prepared from INFUSE D9530.05. Lamination was carried out at room temperature by positioning the adhesive layer between the backing layer and the release liner and rolling the assembly using a 4.5 pound rubber covered roller. The resulting optically clear adhesive tape (Adhesive Composition 5-Backing Layer 4-Adhesive Composition 5) was characterized as shown in Table 1.

Example 8

Two samples of Adhesive Layer 6 (DOW CORNING 7657 Adhesive cured using SYL-OFF 4000 Catalyst) were laminated onto Backing Layer 2 prepared from EXACT 8210. Lamination was carried out at room temperature by positioning the adhesive layer between the backing layer and the release liner and rolling the assembly using a 4.5 pound rubber covered roller. The resulting optically clear adhesive tape (Adhesive Layer 6-Backing Layer 2-Adhesive Layer 6) was characterized as shown in Table 1.

Example 9

Two samples of Adhesive Layer 1 (50 weight percent SPU and 50 weight percent SR-545) were laminated onto Backing Layer 5 prepared from VISTAMAXX 6102. Lamination was carried out at room temperature by transfer laminating the adhesive film to each side of the air corona treated VISTAMAXX 6102 film using 25 psi lamination pressure. The resulting optically clear adhesive tape (Adhesive Layer 1-Backing Layer 5-Adhesive Layer 1) was characterized as shown in Table 1.

Example 10

Adhesive Layer 1 (50 weight percent SPU and 50 weight percent SR-545) was laminated onto the first side of Backing Layer 2 prepared from EXACT 8210. Adhesive Layer 6 (DOW CORNING 7657 Adhesive cured using SYL-OFF 4000 Catalyst) was laminated onto the second side of Backing Layer 2 prepared from EXACT 8210. The lamination was carried out at room temperature by transfer laminating the adhesive films to each side of the air corona treated EXACT 8210 film using 25 psi lamination pressure. The resulting optically clear adhesive tape (Adhesive Layer 1-Backing Layer 2-Adhesive Layer 6) was characterized as shown in Table 1.

Example 11

Two samples of Adhesive Layer 7 (DC Q2-7735 cured using dichlorobenzoyl peroxide) were laminated onto Backing Layer 2 prepared from EXACT 8210. Lamination was carried out at room temperature by positioning the adhesive layer between the backing layer and the release liner and rolling the assembly using a 4.5 pound rubber covered roller. The resulting optically clear adhesive tape (Adhesive Layer 7-Backing layer 2-Adhesive Layer 7) was characterized as shown in Table 1.

Example 12

Adhesive Layer 9 (50 weight percent SPOx and 50 weight percent Q2-7066 cured with dichlorobenzoyl peroxide) was laminated onto the first side of Backing Layer 2 prepared from EXACT 8210. Adhesive Layer 8 (50 weight percent SPOx and 50 weight percent Q2-7066 cured with dichlorobenzoyl peroxide) was laminated onto the second side of Backing Layer 2 prepared from EXACT 8210. The lamination was carried out at room temperature by transfer laminating the adhesive films to each side of the air corona treated EXACT 8210 film using 25 psi lamination pressure. The resulting optically clear adhesive tape (Adhesive Layer 8-Film Backing 2-Adhesive Layer 9) was characterized as shown in Table 1.

TABLE 1

Summary of Examples

| Example | Adhesive Layers | Film Backing layer | Peel Rate (in/min) | Average Zero Degree Peel Stress (PSI) | Notes about Peel | % Luminous Transmittance | % Haze |
|---|---|---|---|---|---|---|---|
| 1 | 1 | 3 | 5 | 514 | no residue | 91.8 | 1.4 |
| 2 | 1 | 2 | 4 | 360 | no residue | 91.6 | 0.6 |
| 3 | 1 | 1 | stretched by hand | not measured | no residue | not measured | not measured |
| 4 | 2 | 1 | 4 | 350 | no residue | 91.7 | 0.6 |
| 5 | 3 | 2 | 12 | 530 | no residue | 92.2 | 1 |

TABLE 1-continued

Summary of Examples

| Example | Adhesive Layers | Film Backing layer | Peel Rate (in/min) | Average Zero Degree Peel Stress (PSI) | Notes about Peel | % Luminous Transmittance | % Haze |
|---|---|---|---|---|---|---|---|
| 6 | 4 | 2 | 12 | 441 | no residue | 92.1 | 1.3 |
| 7 | 5 | 4 | 12 | 493 | no residue | 91.7 | 1.2 |
| 8 | 6 | 2 | 12 | 490 | no residue | 92.4 | 1.1 |
| 9 | 1 | 5 | 12 | 321 | no residue | 91.9 | 0.6 |
| 10 | 1 & 6 | 2 | 12 | 503 | no residue | 92.1 | 0.7 |
| 11 | 7 | 2 | 12 | 495 | no residue | 92.4 | 1.1 |
| 12 | 8 & 9 | 2 | 12 | 510 | no residue | 91.4 | 1.6 |

We claim:

1. An adhesive article comprising:

a backing layer comprising a poly(alkylene) copolymer; and a first pressure-sensitive adhesive layer adjacent to a first major surface of the backing layer, the pressure-sensitive adhesive layer comprising a polydiorganosiloxane polyoxamide block copolymer, wherein the adhesive article is stretchable at least 50 percent in a first direction without breaking.

2. The adhesive article of claim 1, wherein the polydiorganosiloxane polyoxamide block copolymer is crosslinked.

3. The adhesive article of claim 1, wherein the first pressure-sensitive adhesive layer further comprises a tackifying resin.

4. The adhesive article of claim 3, wherein the first pressure-sensitive adhesive layer comprises (a) 30 to 90 weight percent polydiorganosiloxane polyoxamide block copolymer and (b) 10 to 70 weight percent tackifying resin.

5. The adhesive article of claim 4, wherein the tackifying resin comprises a silicone tackifying resin.

6. The adhesive article of claim 1, further comprising a second pressure-sensitive adhesive layer adjacent to a second major surface of the backing layer.

7. The adhesive article of claim 6, wherein the second pressure-sensitive adhesive layer comprises a polydiorganosiloxane polyoxamide block copolymer.

8. The adhesive article of claim 1, wherein the first pressure-sensitive adhesive layer is adhered to a first substrate.

9. The adhesive article of claim 6, wherein the first pressure-sensitive adhesive layer is adhered to a first substrate and the second pressure-sensitive adhesive layer is adhered to a second substrate.

10. The adhesive article of claim 8, wherein the first pressure-sensitive adhesive layer comprises (a) 30 to 90 weight percent polydiorganosiloxane polyoxamide block copolymer and (b) 10 to 70 weight percent tackifying resin.

11. The adhesive article of claim 9, wherein each of the first pressure-sensitive adhesive layer and the second pressure-sensitive adhesive layer comprises (a) 30 to 90 weight percent polydiorganosiloxane polyoxamide block copolymer and (b) 10 to 70 weight percent tackifying resin.

12. The adhesive article of claim 1, wherein the poly(alkylene) copolymer comprises a polymerized product of a reaction mixture comprising (1) a first alkene selected from ethene, propene, or a mixture thereof; and (2) a second alkene selected from a 1,2-alkene having 4 to 8 carbon atoms; and (3) a metallocene catalyst.

13. The adhesive article of claim 1, wherein the polydiorganosiloxane polyoxamide block copolymer comprises at least two repeat units of Formula (III)

$$*-\left[\begin{array}{c}\text{N}-\text{Y}-\underset{\underset{R^1}{|}}{\overset{\overset{R^1}{|}}{\text{Si}}}-(\text{O}-\underset{\underset{R^1}{|}}{\overset{\overset{R^1}{|}}{\text{Si}}})_n-\text{O}-\underset{\underset{R^1}{|}}{\overset{\overset{R^1}{|}}{\text{Si}}}-\text{Y}-\underset{\text{H}}{\text{N}}-\overset{\overset{O}{\|}}{\text{C}}-\overset{\overset{O}{\|}}{\text{C}}\end{array}\right]_p \underset{\underset{}{}}{\overset{R^3}{\text{N}}}-\text{G}-\underset{}{\overset{R^3}{\text{N}}}-\overset{\overset{O}{\|}}{\text{C}}-\overset{\overset{O}{\|}}{\text{C}}-* \quad (\text{III})$$

wherein each $R^1$ is independently an alkyl, haloalkyl, alkenyl, aralkyl, aryl, or aryl substituted with an alkyl, alkoxy, or halo;

each Y is independently an alkylene, an aralkylene, an arylene, or a combination thereof; and G is a residual unit that is equal to a diamine compound of formula $R^3HN-G-NHR^3$ minus the two amino groups of formula $-NHR^3$;

each $R^3$ is hydrogen, alkyl, or taken together with G and with the nitrogen to which both $R^3$ and G are attached formed a heterocyclic group;

n is an integer in a range of 40 to 1500;

p is an integer in a range of 1 to 10; and each asterisk (*) indicates a site of attachment of the repeat unit to another group in the copolymer.

14. The adhesive article of claim 1, wherein the polydiorganosiloxane polyoxamide block copolymer comprises greater than 50 weight percent polydiorganosiloxane segments based on the total weight of the polydiorganosiloxane polyoxamide block copolymer.

15. The adhesive article of claim 1, wherein the polydiorganosiloxane polyoxamide block copolymer comprises greater than 90 weight percent polydiorganosiloxane segments based on the total weight of the polydiorganosiloxane polyoxamide block copolymer.

16. The adhesive article of article 9, wherein at least one of the first substrate or the second substrate is selected from a display, polarizer, touch panel, lens, reflector, diffraction grating, mirror, projection prism, or multilayer optical film.

17. The adhesive article of claim 1, wherein the backing layer has a thickness that varies by less than 10 percent in any direction.

18. The adhesive article of claim 1, wherein the backing layer is free or substantially free of an anti-blocking agent, a slip agent, or both.

19. The adhesive article of claim 6, wherein the second pressure-sensitive adhesive layer and the first pressure-sensitive adhesive layer have different adhesive strength.

20. The adhesive article of claim 9, wherein the second substrate can be seen when viewed through the first substrate, the first pressure-sensitive adhesive layer, the backing, and the second pressure-sensitive adhesive layer.

21. The adhesive article of claim 1, wherein the article is a tape.

* * * * *

UNITED STATES PATENT AND TRADEMARK OFFICE
CERTIFICATE OF CORRECTION

PATENT NO.       : 9,238,758 B2
APPLICATION NO.  : 14/167443
DATED            : January 19, 2016
INVENTOR(S)      : Michael Determan Page 1 of 1

It is certified that error appears in the above-identified patent and that said Letters Patent is hereby corrected as shown below:

Column 1
Line 9, delete "Mar. 9, 2009," and insert -- Mar. 12, 2009, --, therefor.

Column 7
Line 16, delete "mPa," and insert -- MPa, --, therefor.

Column 18
Line 27, delete "Hunstman" and insert -- Huntsman --, therefor.

Line 30, delete "Hunstman" and insert -- Huntsman --, therefor.

Column 21
Line 61, delete "polydiorganosilixane" and insert -- polydiorganosiloxane --, therefor.

Column 31
Line 46, delete "a am-" and insert -- α,ω- --, therefor.

Column 34
Line 7, delete "tackfier" and insert -- tackifier --, therefor.

Signed and Sealed this
Twenty-eighth Day of June, 2016

Michelle K. Lee
*Director of the United States Patent and Trademark Office*